United States Patent
Wewel

(10) Patent No.: US 8,244,939 B2
(45) Date of Patent: Aug. 14, 2012

(54) METHOD AND APPARATUS FOR DYNAMICALLY ALLOCATING QUEUE DEPTH BY INITIATOR

(75) Inventor: Paul Allen Wewel, Broomfield, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 0 days.

(21) Appl. No.: 13/070,395

(22) Filed: Mar. 23, 2011

(65) Prior Publication Data

US 2011/0307636 A1 Dec. 15, 2011

Related U.S. Application Data

(60) Provisional application No. 61/353,777, filed on Jun. 11, 2010.

(51) Int. Cl.
*G06F 3/00* (2006.01)
*G06F 13/00* (2006.01)

(52) U.S. Cl. ............. 710/56; 710/52; 711/170; 711/171

(58) Field of Classification Search ........................ None
See application file for complete search history.

(56) References Cited

U.S. PATENT DOCUMENTS

| | | | | |
|---|---|---|---|---|
| 5,572,645 | A | * | 11/1996 | Dan et al. ................... 345/501 |
| 5,974,518 | A | * | 10/1999 | Nogradi ........................ 711/173 |
| 6,813,658 | B2 | * | 11/2004 | Lam et al. ...................... 710/54 |
| 2004/0047367 | A1 | * | 3/2004 | Mammen ....................... 370/472 |
| 2007/0079071 | A1 | * | 4/2007 | Saha et al. ..................... 711/118 |

OTHER PUBLICATIONS

Wikipedia's "iSCSI" retrieved Feb. 2, 2011. http://en.wikipedia.org/wiki/ISCSI.
Wikipedia's "Flow Control" retrieved Feb. 2, 2011. http://en.wikipedia.org/wiki/Flow_control.
RFC2914—Congestion Control Principles—The Internet society, best current practice 41, Sep. 2000.
RFC3347—Small Computer Systems Interface protocol over the Internet (iSCSI) requirements and design considerations—The Internet society, informational, Jul. 2002.
RFC3720—Internet Small Computer Systems Interface (iSCSI)—The internet society, standards track, Apr. 2004.
RFC3721—Internet Small Computer Systems Interface (iSCSI) naming and discovery—The internet society, informational, Apr. 2004.
RFC3723—Securing block storage protocols over IP—The internet society, standards track, Apr. 2004.

* cited by examiner

*Primary Examiner* — Henry Tsai
*Assistant Examiner* — Michael Sun
(74) *Attorney, Agent, or Firm* — Thomas J. Lavan

(57) ABSTRACT

A method for maximizing I/O requests to a target port is provided. The method includes a storage controller obtaining an initiator allowed queue depth, receiving an I/O request and a current sequence identifier from an initiator logged into the target port, and determining if the initiator allowed queue depth is equal to a first queue depth corresponding to the initiator. If the initiator allowed queue depth is equal to the first queue depth then returning a queue full indication and a maximum sequence identifier equal to the current sequence identifier to the initiator. If the initiator allowed queue depth is not equal to the first queue depth then placing the I/O request on a queue, incrementing the first queue depth, and adjusting the maximum sequence identifier. Adjusting the maximum sequence identifier includes adding the current sequence identifier to the initiator allowed queue depth and subtracting the first queue depth.

23 Claims, 18 Drawing Sheets

Fig. 1b iSCSI flow control between initiator and target

Fig. 4a  Initiator allowed queue depth for one initiator port login
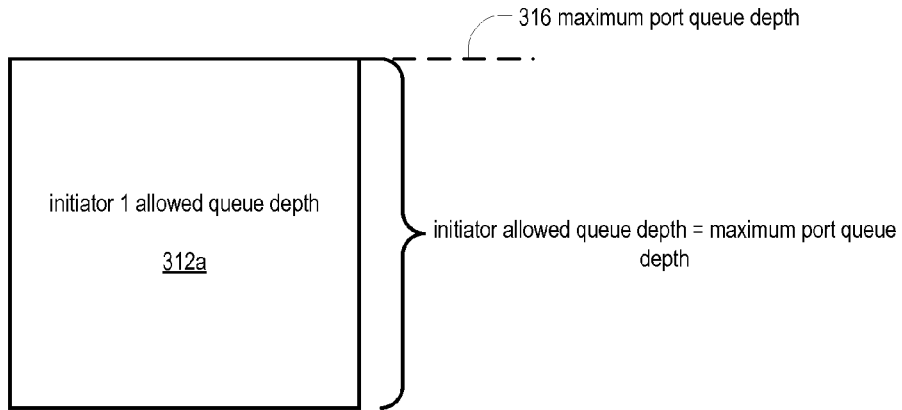
Fig. 4b  Initiator allowed queue depth for two initiator port logins
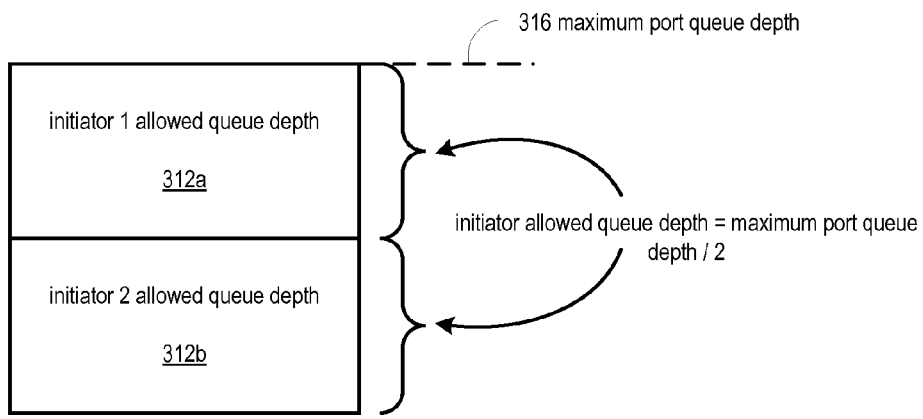
Fig. 4c  Initiator allowed queue depth for three initiator port logins
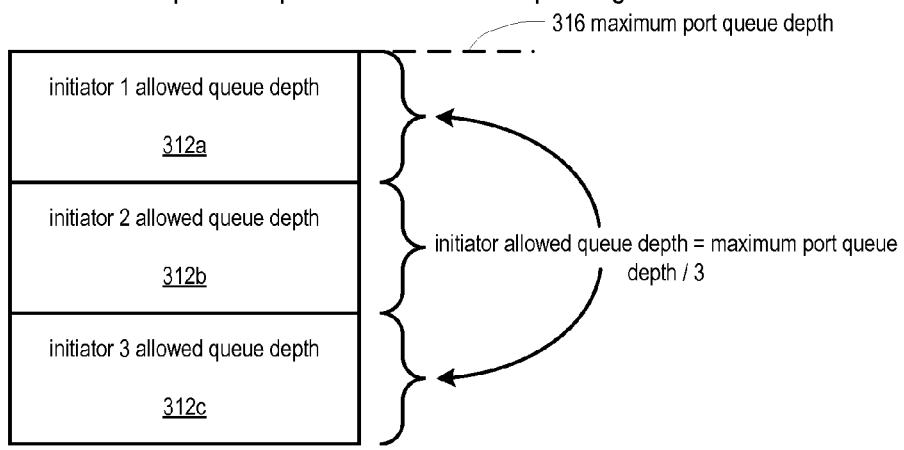

Fig. 5a  Target port queue depth for two initiator port logins
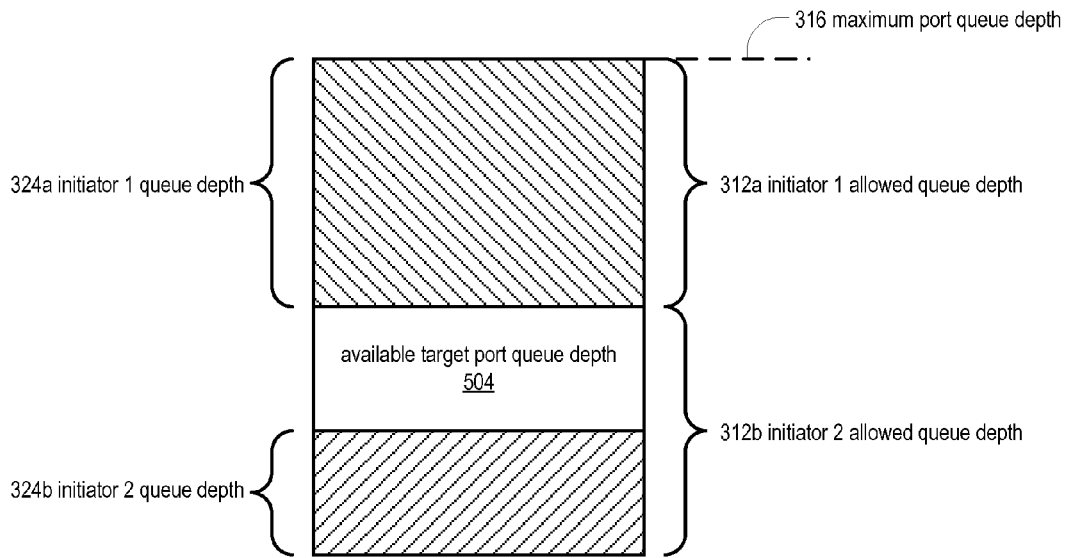
Fig. 5b  Target port queue depth for two initiator port logins, with borrowing
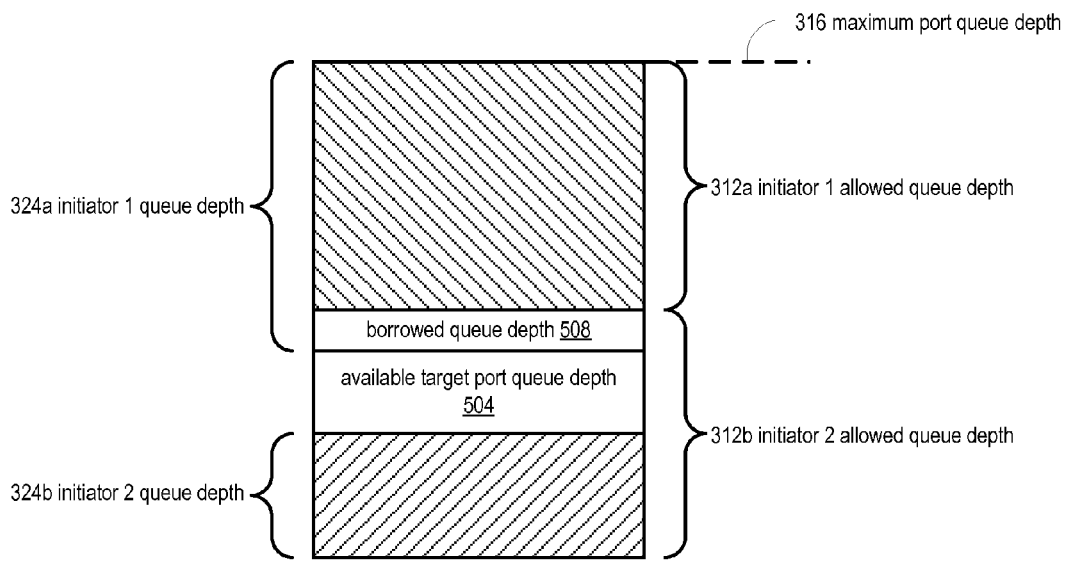

Fig. 6a  Target port queue depth for two port logins (transfer) phase 1
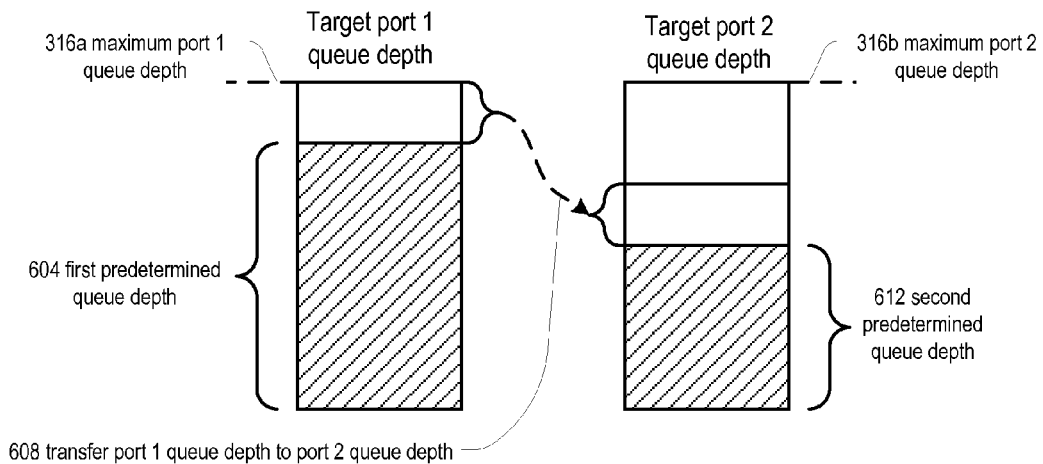
Fig. 6b  Target port queue depth for two port logins (transfer) phase 2
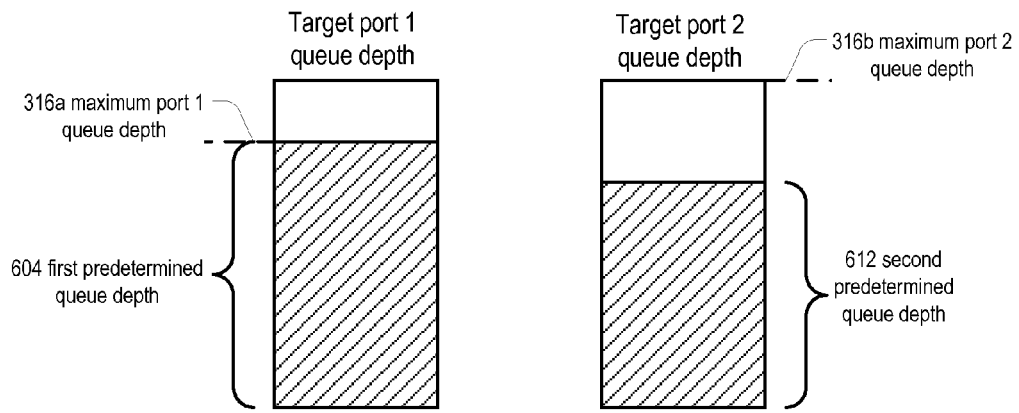

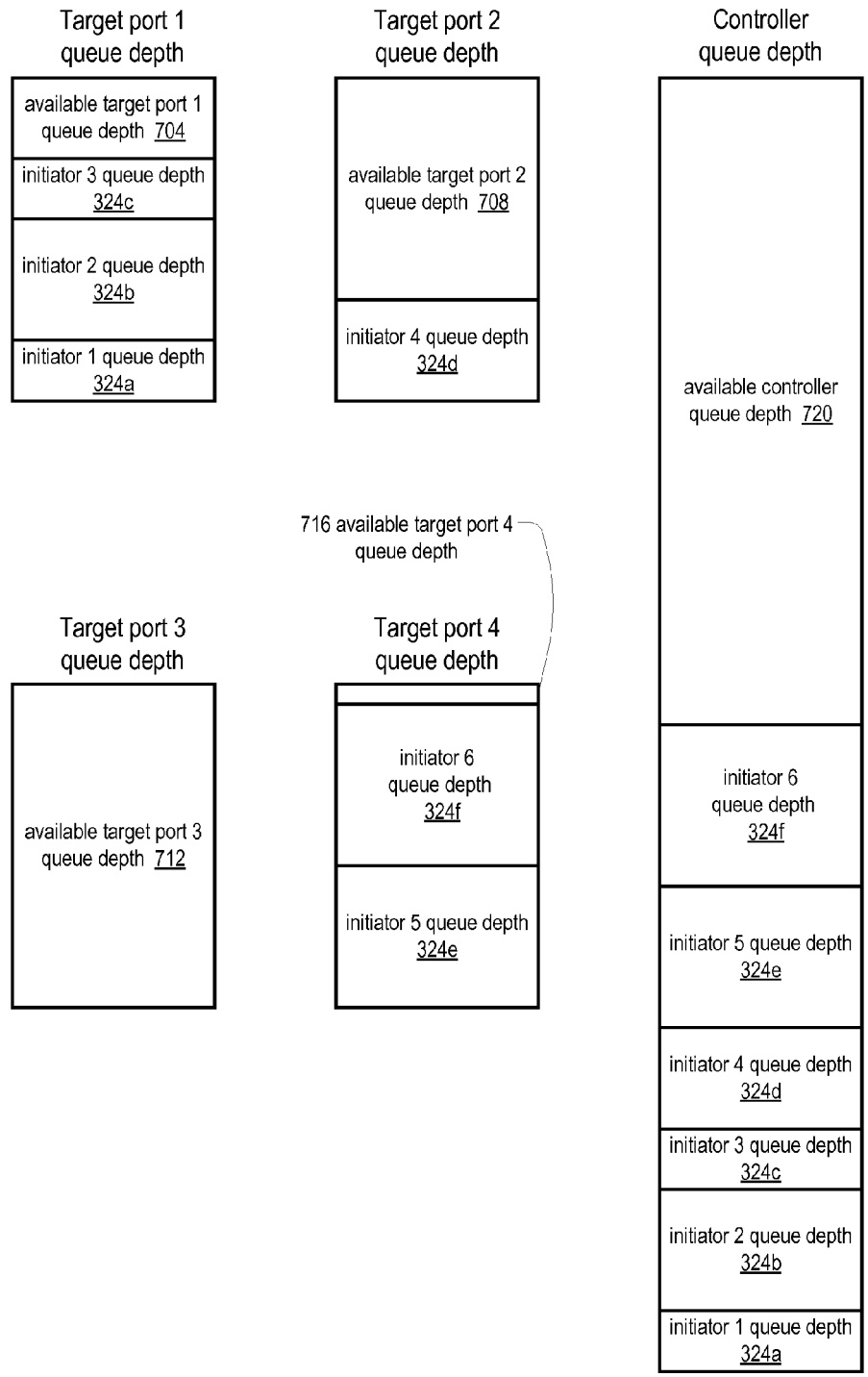
Fig. 7  Aggregate port queue depth across a controller

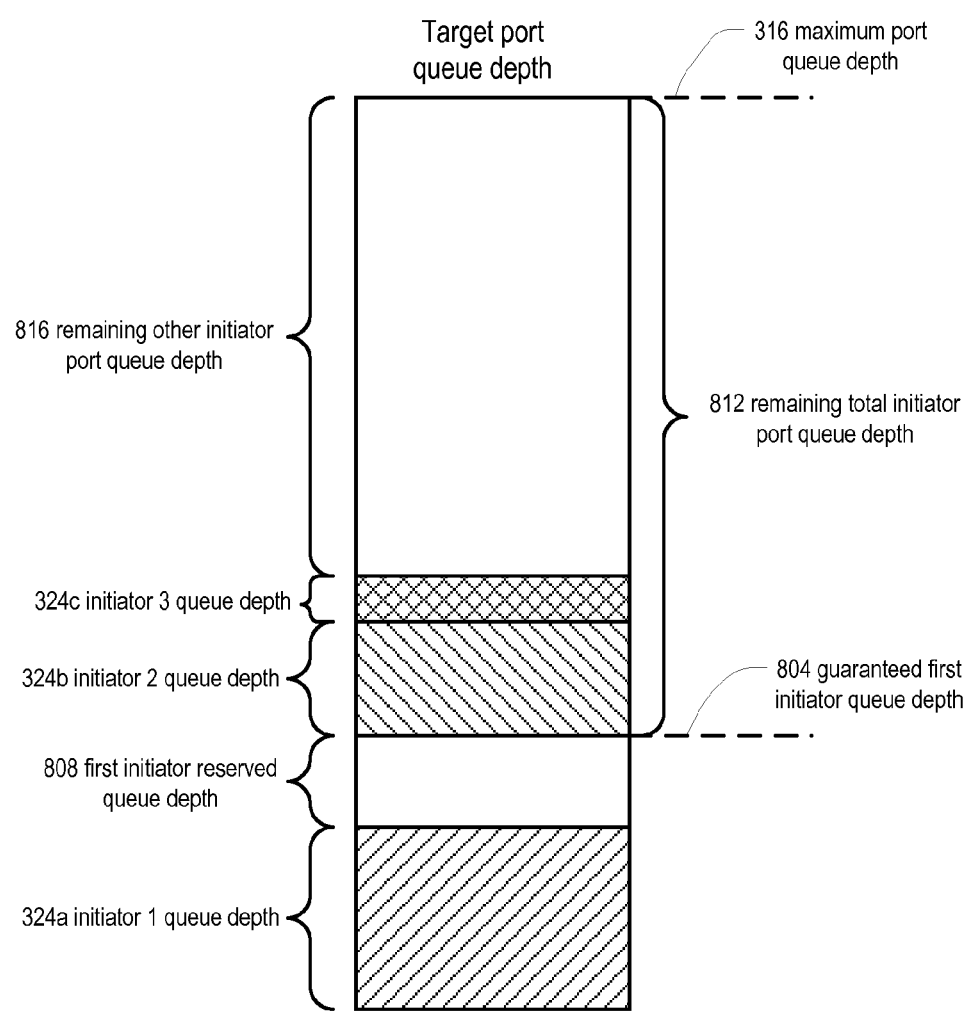
Fig. 8  Guaranteed initiator queue depth, manage to port queue depth

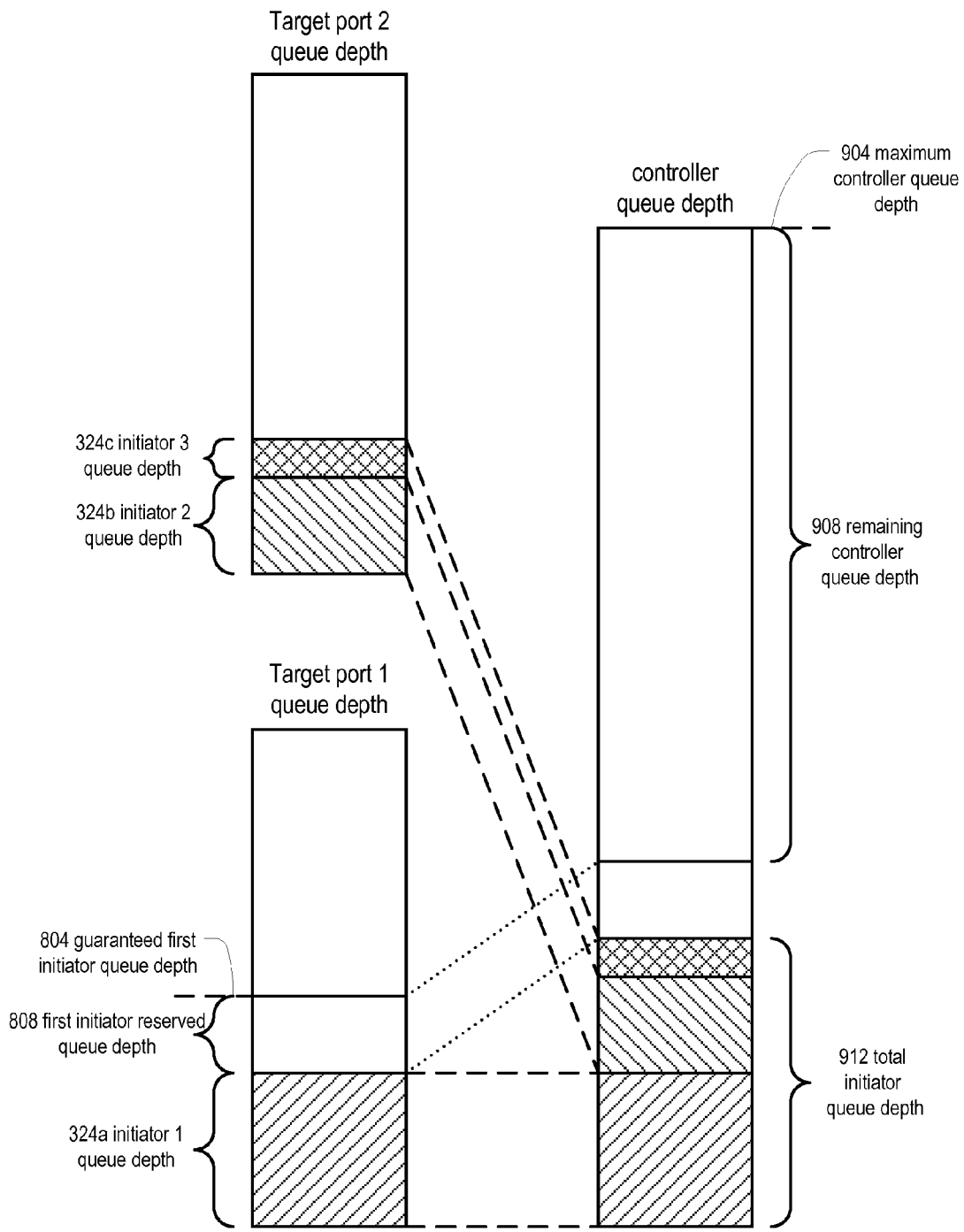
Fig. 9  Guaranteed initiator queue depth, manage to controller queue depth Fig. 10a    New initiator login
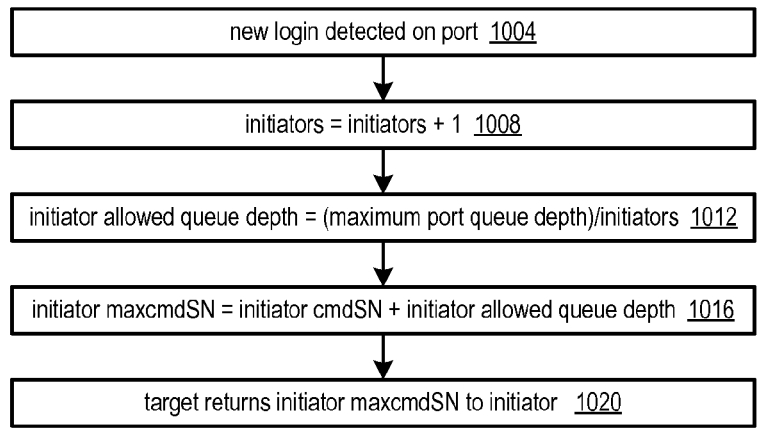
Fig. 10b    Initiator logs out
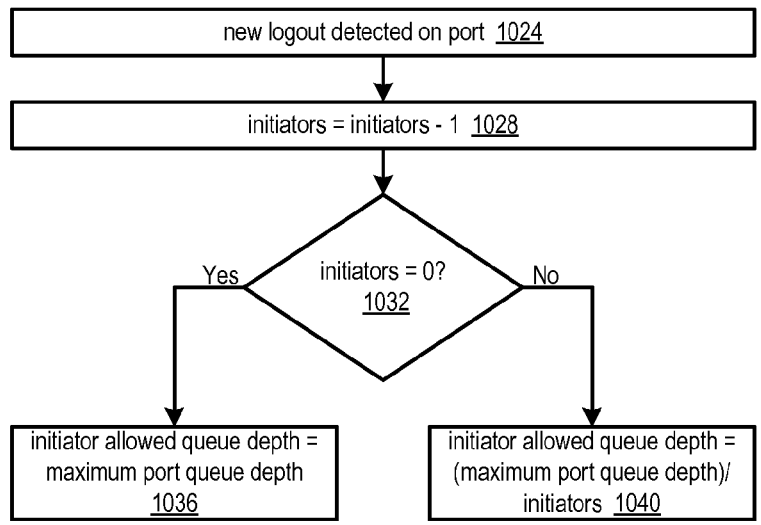

Fig. 11a  Initiator I/O processing: manage to port allowed queue depth
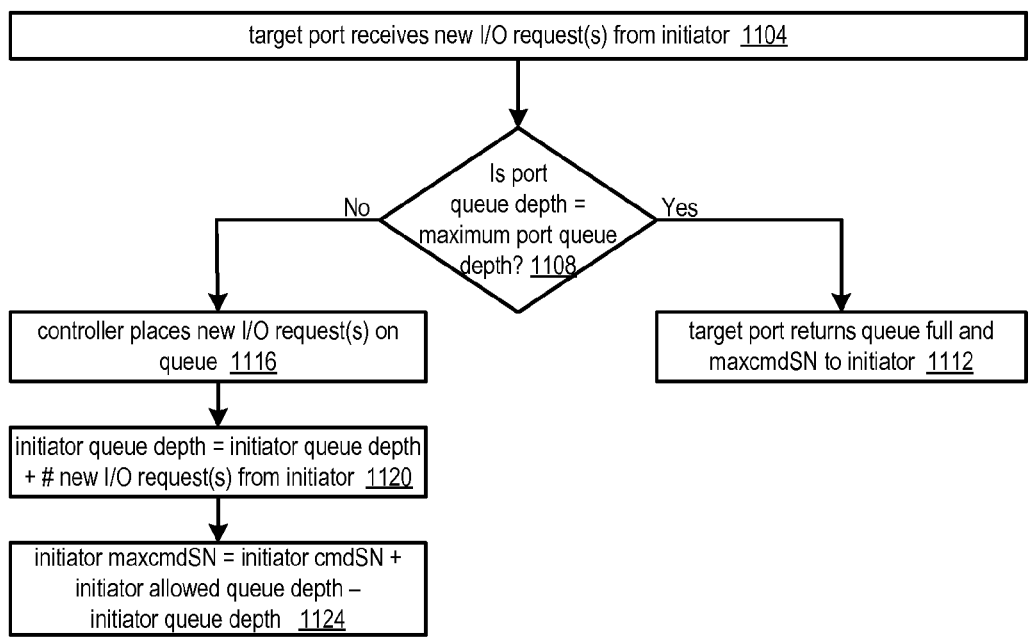
Fig. 11b  Command completion: manage to port allowed queue depth
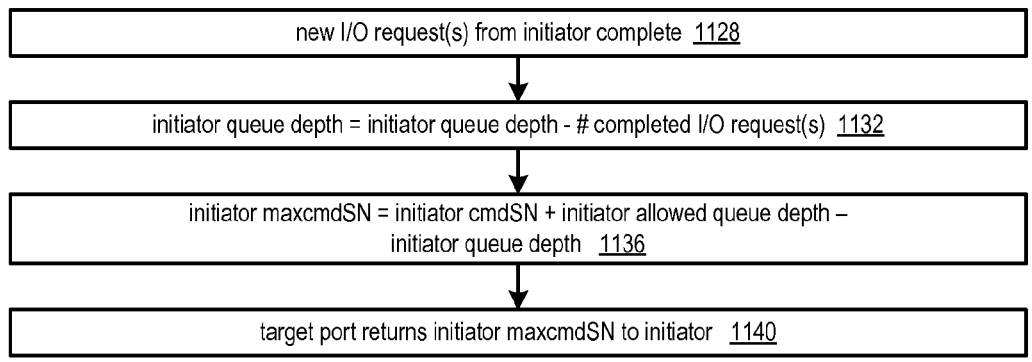

Fig. 12a    Initiator I/O processing: manage to port maximum queue depth
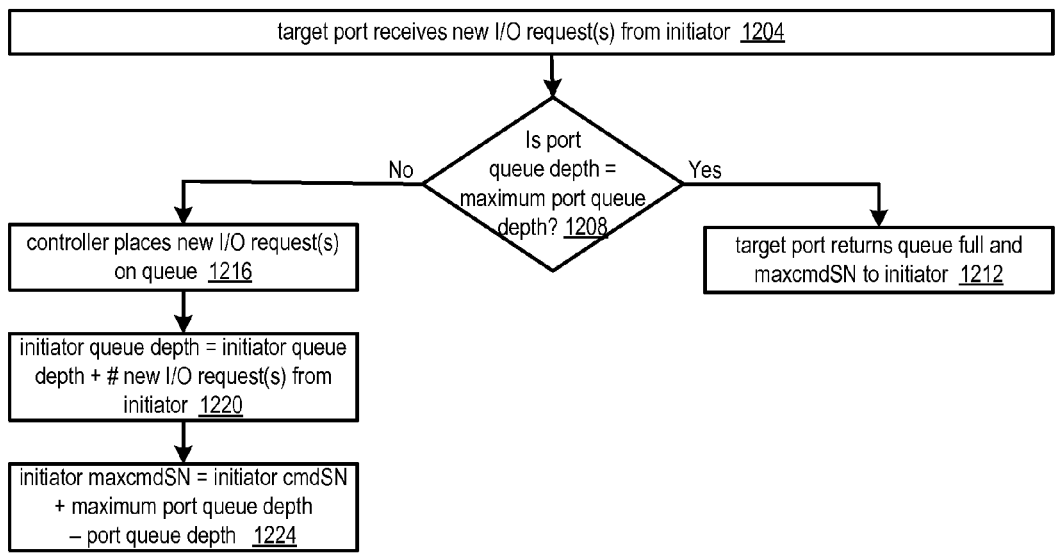
Fig. 12b    Command completion: manage to port maximum queue depth
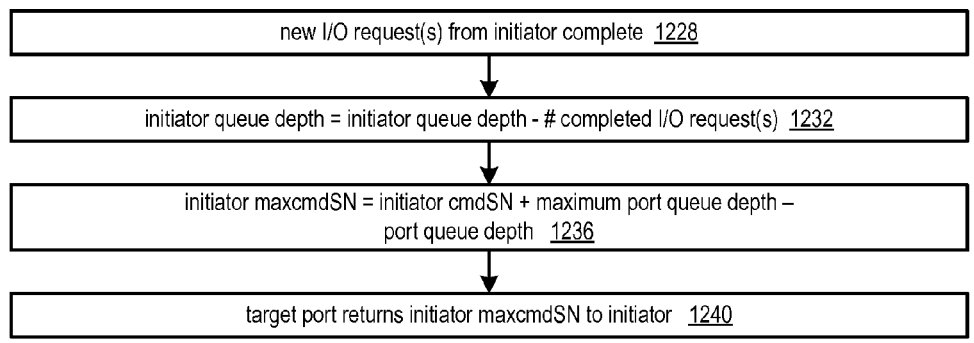

Fig. 13a  Initiator I/O processing: manage to port allowed queue depth, then controller maximum queue depth
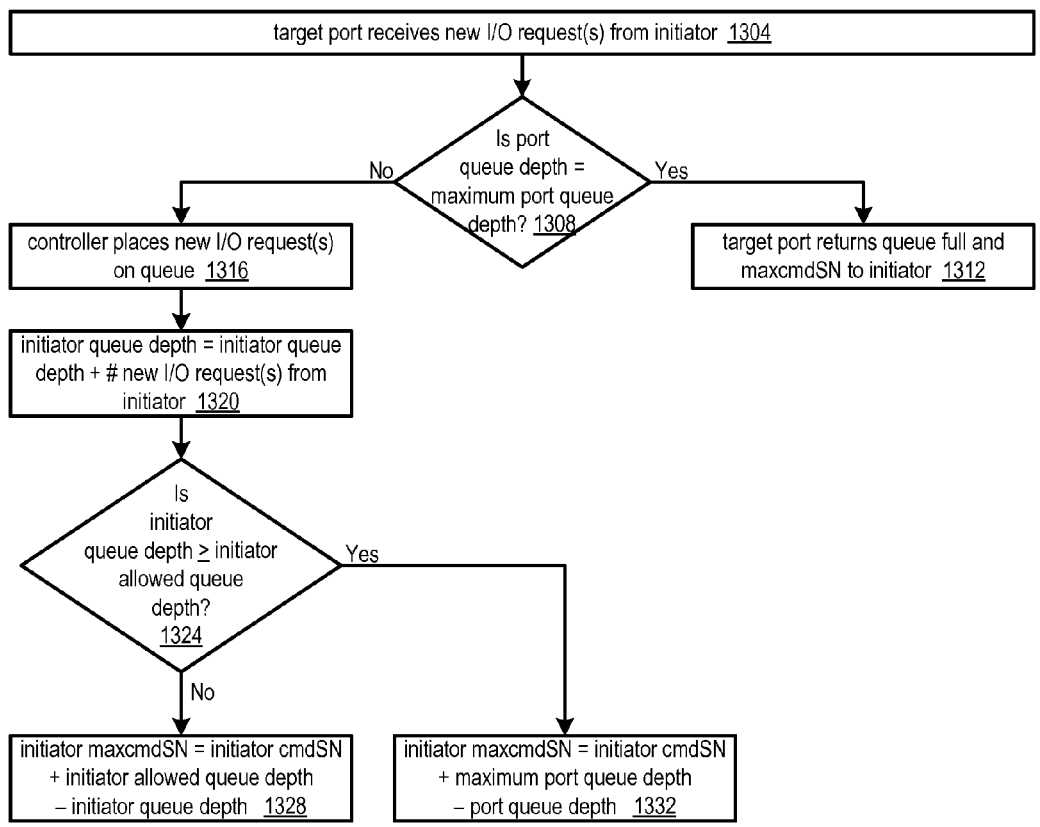

Fig. 13b  Command completion: manage to port allowed queue depth, then controller maximum queue depth

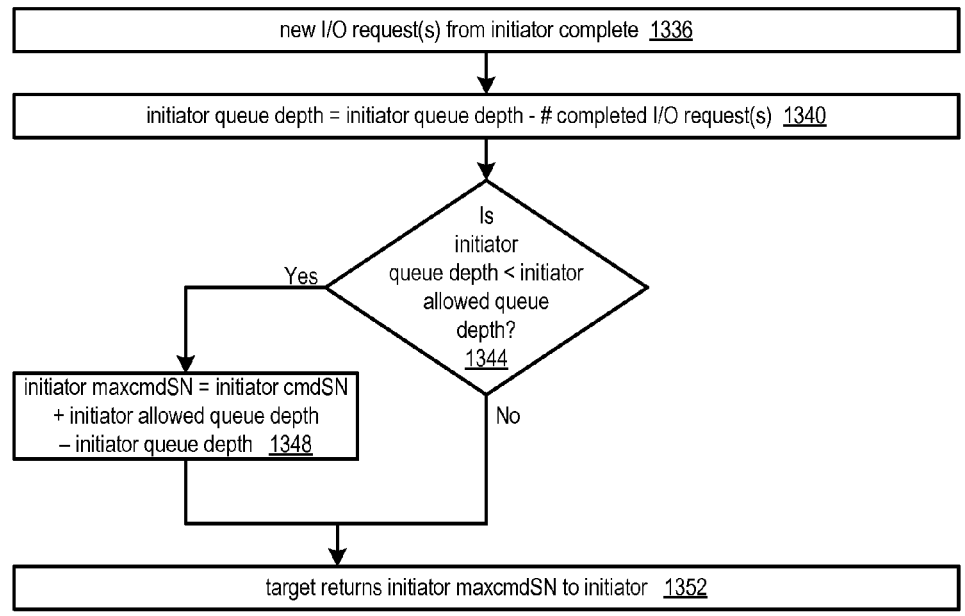

- port queue depth = sum of initiator queue depths
- maximum port queue depth =
    1. controller maximum port queue depth/# of ports, or
    2. controller maximum port queue depth/# of ports with at least 1 initiator logged in
- initiator queue depth = outstanding I/O count for initiator. Automatically decremented when an I/O for the initiator completes Fig. 14a    Initiator I/O processing: manage to controller maximum queue depth
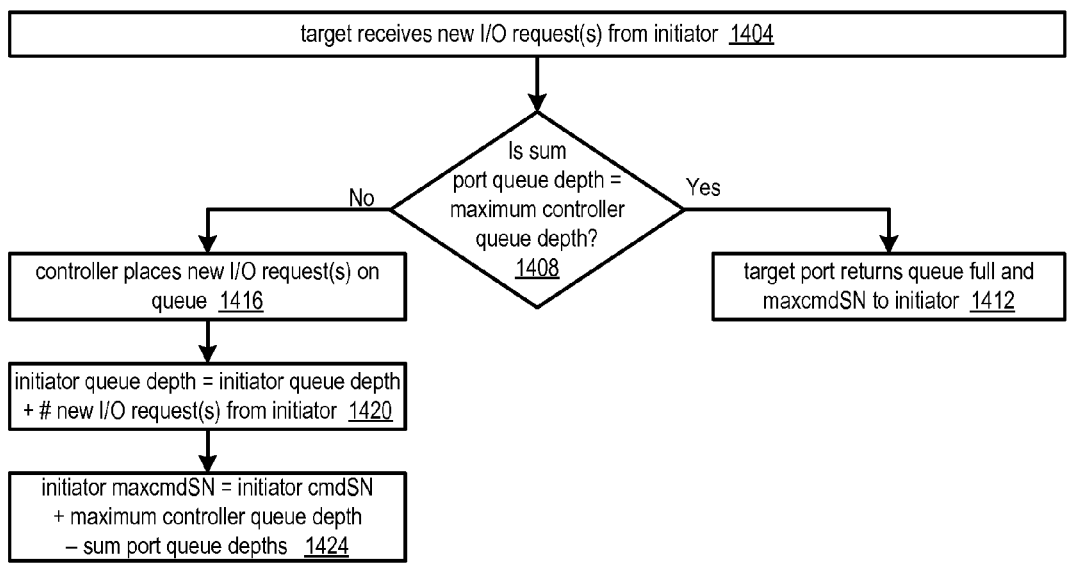
Fig. 14b    Command completion: manage to controller maximum queue depth
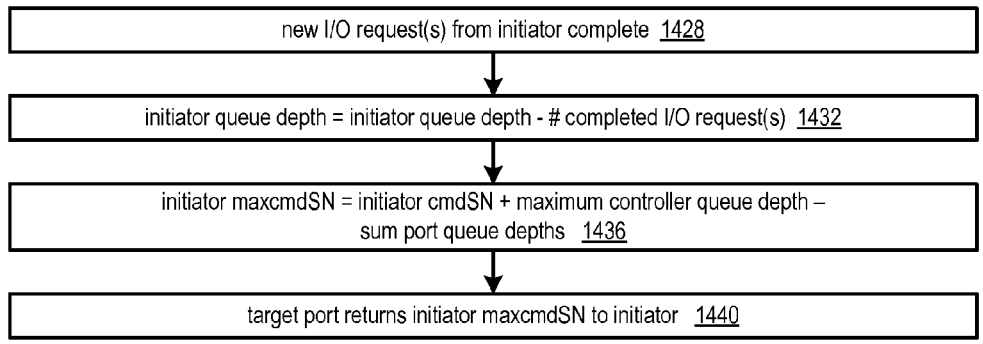

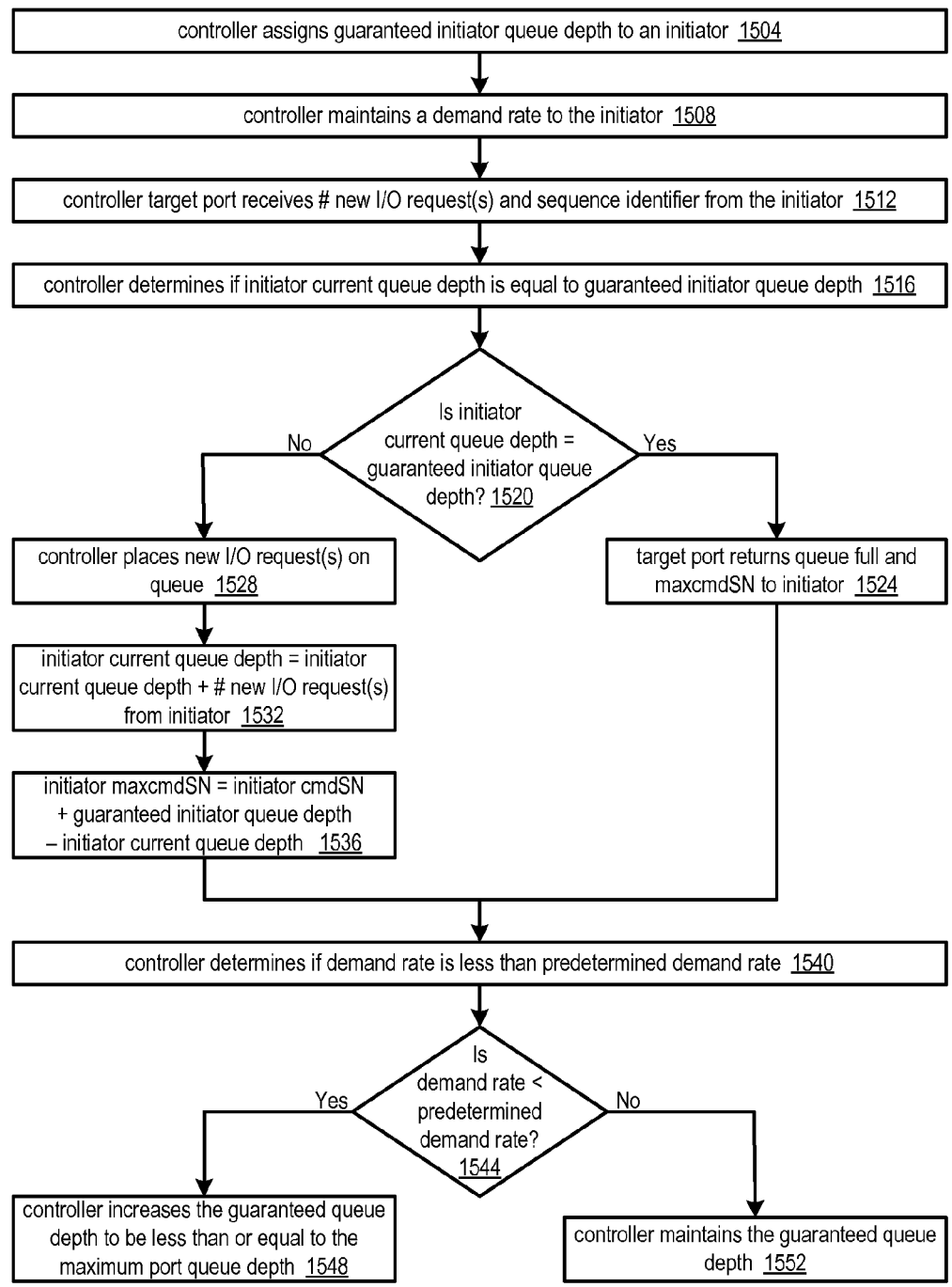
Fig. 15  Guaranteed initiator queue depth, manage to port queue depth Fig. 16    Example of queue depth management for two initiators

| time | initiator 1 | | | | | | initiator 2 | | | | | | total QD | event |
|---|---|---|---|---|---|---|---|---|---|---|---|---|---|---|
| | New I/O Req$_1$ | CmdSN$_1$ | Allow QD$_1$ | Curr QD$_1$ | Max Cmd SN$_1$ | QF$_1$ | New I/O Req$_2$ | CmdSN$_2$ | Allow QD$_2$ | Curr QD$_2$ | Max Cmd SN$_2$ | QF$_2$ | | |
| 0 | 0 | 0 | 0 | 0 | 0 | x | x | x | 0 | 0 | 0 | x | x | 0 | initialization |
| 10 | x | x | 0 | 0 | 0 | x | x | x | x | 0 | 0 | x | x | 0 | init$_1$ logs in |
| 11 | x | x | 512 | 0 | 512 | n | x | x | x | 0 | 0 | x | x | 0 | target response |
| 637 | 100 | 600 | 512 | 410 | x | x | x | x | x | 0 | 0 | x | x | 410 | init$_1$ I/O request |
| 638 | x | x | 512 | 510 | 602 | n | x | x | x | 0 | 0 | x | x | 510 | target response |
| 639 | x | x | 512 | 510 | x | x | x | x | 0 | 0 | 0 | x | x | 510 | init$_2$ logs in |
| 640 | x | x | 256 | 510 | x | x | x | x | 256 | 0 | 256 | n | x | 510 | target response |
| 641 | 2 | 602 | 256 | 510 | x | x | x | x | 256 | 0 | x | x | x | 510 | init$_1$ I/O request |
| 642 | x | x | 256 | 512 | 602 | n | x | x | 256 | 0 | x | x | x | 512 | target response |
| 700 | x | x | 256 | 508 | x | x | 3 | 3 | 256 | 0 | x | x | x | 508 | init$_2$ I/O request |
| 701 | x | x | 256 | 508 | x | x | x | x | 256 | 3 | 256 | n | x | 511 | target response |
| 702 | x | x | 256 | 508 | x | x | 1 | 4 | 256 | 3 | x | x | x | 511 | init$_2$ I/O request |
| 703 | x | x | 256 | 508 | x | x | x | x | 256 | 4 | 256 | n | x | 512 | target response |
| 704 | x | x | 256 | 508 | x | x | 20 | 24 | 256 | 4 | x | x | x | 512 | init$_2$ I/O request |
| 705 | x | x | 256 | 508 | x | x | x | x | 256 | 4 | 276 | y | x | 512 | target response |
| 1300 | x | x | 256 | 259 | 602 | x | x | x | 256 | 4 | x | x | x | 263 | cmnd completes |
| 1301 | x | x | 256 | 258 | 602 | x | x | x | 256 | 3 | 277 | x | x | 261 | cmnd completes |
| 1302 | x | x | 256 | 257 | 602 | x | x | x | 256 | 3 | x | x | x | 260 | cmnd completes |
| 1303 | x | x | 256 | 256 | 602 | x | x | x | 256 | 2 | 278 | x | x | 258 | cmnd completes |
| 1304 | x | x | 256 | 256 | 602 | x | x | x | 256 | 1 | 279 | x | x | 257 | cmnd completes |
| 1305 | x | x | 256 | 255 | 603 | x | x | x | 256 | 1 | x | x | x | 256 | cmnd completes |
| 1320 | 1 | 603 | 256 | 255 | x | x | x | x | 256 | 1 | x | x | x | 256 | init$_1$ I/O request |
| 1321 | x | x | 256 | 256 | 603 | n | x | x | 256 | 1 | x | x | x | 257 | target response |
| 1322 | x | x | 256 | 256 | x | x | 255 | 279 | 256 | 1 | x | x | x | 257 | init$_2$ I/O request |
| 1323 | x | x | 256 | 256 | x | x | x | x | 256 | 256 | 279 | x | x | 512 | target response |
| 1324 | x | x | 256 | 256 | x | x | x | x | 256 | 255 | 280 | x | x | 511 | cmnd completes |
| 1325 | x | x | 256 | 255 | 604 | x | x | x | 256 | 255 | x | x | x | 510 | cmnd completes |

METHOD AND APPARATUS FOR DYNAMICALLY ALLOCATING QUEUE DEPTH BY INITIATOR

CROSS REFERENCE TO RELATED APPLICATION(S)

This application claims the benefit of U.S. Provisional Application Ser. No. 61/353,777 filed Jun. 11, 2010, entitled DYNAMIC ADJUSTMENT OF iSCSI TARGET QUEUE DEPTH PER CONNECTION, which is hereby incorporated by reference for all purposes and which were owned or subject to an obligation of assignment to Dot Hill Systems Corporation at the time the invention claimed herein was made.

FIELD

The present invention is directed to computer communication. In particular, the present invention is directed to methods and apparatuses for maximizing the number of outstanding I/O requests serviced by a target port, a plurality of target ports, or a controller incorporating one or more target ports.

BACKGROUND

In data communications, flow control is the process of managing the rate of data transmission between two nodes to prevent a faster sender from outrunning a slower receiver. It provides a mechanism for the receiver to control the transmission speed, so that the receiving node is not overwhelmed with data from transmitting node. Flow control is important because it is possible for a sending computer to transmit information at a faster rate than the destination computer can receive and process the information. This can happen if the receiving computers have a heavy traffic load in comparison to the sending computer, or if the receiving computer has less processing power or less memory resources than the sending computer.

Target ports utilize queue depth to control data flow between initiators and the target port. Queue depth is the number of I/O requests a target port can allocate to an initiator. When a new I/O request is received from an initiator, the target increments the queue depth. When the target completes an I/O request, the target decrements the queue depth. There is a maximum queue depth for each target port, and the target device allocates a maximum initiator queue depth to each initiator. When the maximum initiator queue depth is reached, the target returns a queue full status to the initiator. Queue full indicates the target port cannot process more I/O requests from the initiator until one or more queued I/O requests from the initiator have completed.

The iSCSI protocol utilizes flow control to regulate data communication traffic between initiators and targets. The iSCSI protocol, flow control, and related issues are defined in the following documents copyrighted by the Internet Society, and incorporated by reference into the present specification:
  RFC2914 "Congestion control principles"
  RFC3720 "iSCSI transport protocol description"
  RFC3721 "iSCSI naming and discovery"
  RFC3723 "Securing block storage protocols over IP"
  RFC3347 "iSCSI requirements and design considerations"

The iSCSI protocol utilizes a command sequence number (CmdSN) and a maximum command sequence number (MaxcmdSN) to implement flow control between each initiator and target. The initiator transfers CmdSN to the target, and the target responds with MaxcmdSN to the initiator.

CmdSN is the current command Sequence Number, advanced by 1 on each command shipped except for commands marked for immediate delivery. CmdSN always contains the number to be assigned to the next Command PDU. CmdSN enables ordered delivery across multiple connections in a single session. CmdSN is either the initial command sequence number of a session (for the first login request of a session—the "leading" login), or the command sequence number in the command stream if the login is for a new connection in an existing session.

MaxcmdSN is the maximum number to be shipped, and is given to the initiator by the target. For non-immediate commands, the CmdSN field can take any value from the previous value of CmdSN to MaxCmdSN. The target must silently ignore any non-immediate command outside of this range or non-immediate duplicates within the range.

SUMMARY

The present invention is directed to solving disadvantages of the prior art. In accordance with embodiments of the present invention, a method for maximizing I/O requests to a target port is provided. The method includes a controller comprising a target port obtaining an initiator allowed queue depth, receiving a new I/O request and a current sequence identifier from a first initiator logged into the target port, determining if the initiator allowed queue depth is equal to a first queue depth, where the first queue depth corresponds to the first initiator. If the initiator allowed queue depth is equal to the first queue depth then returning a queue full indication and a maximum sequence identifier to the first initiator, where the maximum sequence identifier is equal to the current sequence identifier from the first initiator. If the initiator allowed queue depth is not equal to the first queue depth then placing the new I/O request on a queue, incrementing the first queue depth, and adjusting the maximum sequence identifier. Adjusting the maximum sequence identifier includes adding the current sequence identifier to the initiator allowed queue depth and subtracting the first queue depth.

In accordance with embodiments of the present invention, a controller that maximizes I/O requests from a plurality of initiators is provided. The controller includes a target port, where the target port receives I/O requests from the plurality of initiators. The plurality of initiators is coupled to the target port. The controller also includes a processor coupled to the target port, where the processor obtains an initiator allowed queue depth. In response to the target port receiving a new I/O request and a current sequence identifier from a first initiator of the plurality of initiators, the processor determines if the initiator allowed queue depth is equal to a first queue depth, where the first queue depth corresponds to the first initiator. If the initiator allowed queue depth is equal to the first queue depth, then the controller returns a queue full indication and a maximum sequence identifier to the first initiator. The maximum sequence identifier is equal to the current sequence identifier from the first initiator. If the initiator allowed queue depth is not equal to the first queue depth, then the controller places the new I/O request on a queue, increments the first queue depth, and adjusts the maximum sequence identifier. Adjusting the maximum sequence identifier comprises the processor adds the current sequence identifier to the initiator allowed queue depth and subtracts the first queue depth.

In accordance with other embodiments of the present invention, a method for maximizing I/O requests to a controller from a plurality of initiators logged into a plurality of target ports of the controller is provided. The method includes obtaining, by the controller, a total initiator queue depth. The total initiator queue depth is a sum of the current queue depths for all initiators logged into the plurality of target ports. The method includes receiving, by a target port of the plurality of target ports, a new I/O request and a current sequence identifier from a first initiator of the plurality of initiators. The method also includes determining, by the controller, if the total initiator queue depth is equal to a maximum controller queue depth. If the total initiator queue depth is equal to the maximum controller queue depth then returning, by the controller, a queue full indication and a maximum sequence identifier to the first initiator. The maximum sequence identifier is equal to the current sequence identifier from the first initiator. If the total initiator queue depth is not equal to the maximum controller queue depth then placing, by the controller, the new I/O request on a queue, incrementing a first queue depth corresponding to the first initiator, and adjusting a maximum sequence identifier. Adjusting the maximum sequence identifier comprises adding the current sequence identifier to the maximum controller queue depth and subtracting the total initiator queue depth. Finally, the method includes completing, by the controller, the new I/O request. In response to completing the new I/O request, modifying, by the controller, the first queue depth. Modifying the first queue depth comprises subtracting the new I/O request from the first queue depth, adjusting, by the controller, the maximum sequence identifier, and sending the maximum sequence identifier to the initiator.

In accordance with another embodiment of the present invention, a method for maximizing I/O requests to a target port of a controller from a plurality of initiators logged into the target port is provided. The method includes assigning, by the controller, a guaranteed first initiator queue depth to a first initiator of the plurality of initiators, receiving a first I/O request and a first sequence identifier from the first initiator, and determining if a first queue depth corresponding to the first initiator is equal to the guaranteed first initiator queue depth. If the first queue depth is equal to the guaranteed first initiator queue depth then returning, by the controller, a queue full indication and a first maximum sequence identifier to the first initiator. The first maximum sequence identifier is equal to the first sequence identifier. If the first queue depth is not equal to the guaranteed first initiator queue depth then placing, by the controller, the first I/O request on a queue, incrementing, by the controller, the first queue depth, and adjusting, by the controller, the first maximum sequence identifier. Adjusting the first maximum sequence identifier includes adding the first sequence identifier to the guaranteed first initiator queue depth and subtracting the first queue depth. The method also includes receiving, by the target port, a second I/O request and a second sequence identifier from a second initiator of the plurality of initiators, and determining, by the controller, if a remaining controller queue depth is equal to zero. The remaining controller queue depth is the difference between a maximum controller queue depth and the sum of current queue depths for all logged-in initiators and a first initiator reserved queue depth. If the remaining controller queue depth is equal to zero then returning, by the controller, a queue full indication and a second maximum sequence identifier to the second initiator. The second maximum sequence identifier is equal to the second sequence identifier. If the remaining controller queue depth is not equal to zero then placing, by the controller, the second I/O request on a queue, incrementing, by the controller, the second queue depth, and adjusting, by the controller, the second maximum sequence identifier. Adjusting the second maximum sequence identifier comprises adding the second sequence identifier to the remaining controller queue depth and subtracting the sum of the current queue depths for all logged-in initiators and the first initiator reserved queue depth.

In accordance with a further embodiment of the present invention, a method for maximizing I/O requests to a controller from a plurality of initiators logged into a number of target ports of the controller is provided. The method includes assigning, by the controller, a guaranteed first initiator queue depth to a first initiator of the plurality of initiators, receiving, by a target port of the number of target ports, a first I/O request and a first sequence identifier from the first initiator, and determining, by the controller, if a first queue depth corresponding to the first initiator is equal to the guaranteed first initiator queue depth. If the first queue depth is equal to the guaranteed first initiator queue depth then returning, by the controller, a queue full indication and a first maximum sequence identifier to the first initiator. The first maximum sequence identifier is equal to the first sequence identifier. If the first queue depth is not equal to the guaranteed first initiator queue depth then placing, by the controller, the first I/O request on a queue, incrementing, by the controller, the first queue depth, and adjusting, by the controller, the first maximum sequence identifier. Adjusting the first maximum sequence identifier comprises adding the first sequence identifier to the guaranteed first initiator queue depth and subtracting the first queue depth. The method further includes receiving, by a target port of the number of target ports, a second I/O request and a second sequence identifier from a second initiator, and determining, by the controller, if a remaining other initiator queue depth is equal to zero. The remaining other initiator queue depth is the difference between a remaining total initiator queue depth and the sum of current queue depths for all logged-in initiators other than the first initiator. The remaining total initiator queue depth is the difference between a maximum controller queue depth and the guaranteed first initiator queue depth. If the remaining other initiator queue depth is equal to zero then returning, by the controller, a queue full indication and a second maximum sequence identifier to the second initiator. The second maximum sequence identifier is equal to the second sequence identifier. If the remaining other initiator queue depth is not equal to zero then placing, by the controller, the second I/O request on a queue, incrementing, by the controller, the second queue depth, and adjusting, by the controller, the second maximum sequence identifier. Adjusting the second maximum sequence identifier includes adding the second sequence identifier to the remaining total initiator queue depth and subtracting the sum of the current queue depths for all logged-in initiators other than the first initiator.

In accordance with yet another embodiment of the present invention, a method for maximizing I/O requests from an initiator logged into a target port of a controller is provided. The method includes assigning, by the controller, a guaranteed initiator queue depth to the initiator, and maintaining, by the controller, a demand rate for the initiator. The demand rate is the number of I/O requests received from the initiator in a predetermined immediately previous time period. The method includes receiving, by the target port, a new I/O request and a sequence identifier from the initiator, and determining, by the controller, if an initiator current queue depth corresponding to the initiator is equal to the guaranteed initiator queue depth. If the initiator current queue depth is equal to the guaranteed initiator queue depth then returning, by the controller, a queue full indication and a maximum sequence identifier to the initiator, wherein the maximum sequence identifier is equal to the sequence identifier. If the initiator current queue depth is not equal to the guaranteed initiator queue depth, the method includes placing, by the controller, the new I/O request on a queue, incrementing, by the controller, the initiator current queue depth, and adjusting, by the controller, the maximum sequence identifier. Adjusting the maximum sequence identifier includes adding the sequence identifier to the guaranteed initiator queue depth and subtracting the initiator current queue depth. The method further includes determining, by the controller, if the demand rate is less than a predetermined demand rate. If the demand rate is less than the predetermined demand rate then maintaining the guaranteed initiator queue depth. If the demand rate is not less than the predetermined demand rate then increasing the guaranteed initiator queue depth to be less than or equal to a maximum port queue depth.

An advantage of the present invention is that it maximizes I/O request utilization of a target port that supports flow control. Conventional art target ports manage each initiator to a fixed queue depth, and do not take into account how many initiators are currently logged into the target port. Instead, conventional art target ports typically divide the maximum port queue depth by the maximum number of simultaneous connections supported, which severely limits the maximum queue depth for a lesser number of logged-in initiators. The present invention keeps track of the number of initiators logged into each target port, and manages each logged-in initiator to an allowed queue depth based on the current number of logged-in initiators.

Another advantage of the present invention is that queue depth is managed over all target ports of a controller. The controller itself manages a maximum queue depth over all target ports, and allocates a queue depth to each logged-in initiator based on the controller maximum queue depth. This has the advantage of allocating more queue depth to initiators when some target ports may be unused in a controller, and increases utilization of controller resources.

Yet another advantage of the present invention is the ability for a first initiator to "borrow" queue depth from other initiators logged into a target port if the first initiator has reached its' allowed queue depth and additional target port resources are available due to other initiators not requiring all of the queue depth resources allocated to the other initiators. Again, this maximizes target port utilization and provides a method for an initiator to have access to increased queue depth during high demand periods.

Another advantage of the present invention is it provides a method to increase an initiator's queue depth based on most recent demand rate, as long as additional queue depth resources are available to be allocated.

Additional features and advantages of embodiments of the present invention will become more readily apparent from the following description, particularly when taken together with the accompanying drawings.

BRIEF DESCRIPTION OF THE DRAWINGS

FIG. 1b is a block diagram illustrating target and initiator flow control for an Internet SCSI (iSCSI) connection in accordance with embodiments of the present invention.

FIG. 4a is a block diagram illustrating initiator allowed queue depth for the case of one initiator login in accordance with embodiments of the present invention.

FIG. 4b is a block diagram illustrating initiator allowed queue depth for the case of two initiator logins in accordance with embodiments of the present invention.

FIG. 4c is a block diagram illustrating initiator allowed queue depth for the case of three initiator logins in accordance with embodiments of the present invention.

FIG. 5a is a block diagram illustrating target port queue depth for two initiator logins in accordance with a first embodiment of the present invention.

FIG. 5b is a block diagram illustrating target port queue depth for two initiator logins in accordance with a second embodiment of the present invention.

FIG. 6a is a block diagram illustrating a first phase of transfer of target port queue depth for two port logins in accordance with an embodiment of the present invention.

FIG. 6b is a block diagram illustrating a second phase of transfer of target port queue depth for two port logins in accordance with an embodiment of the present invention.

FIG. 7 is a block diagram illustrating port queue depth across the target ports of a controller in accordance with an embodiment of the present invention.

FIG. 8 is a block diagram illustrating guaranteed initiator queue depth managed to port queue depth in accordance with an embodiment of the present invention.

FIG. 9 is a block diagram illustrating guaranteed initiator queue depth managed to controller queue depth in accordance with an embodiment of the present invention.

FIG. 10a is a flowchart illustrating a method for managing a new initiator login in accordance with an embodiment of the present invention.

FIG. 10b is a flowchart illustrating a method for managing an initiator logout in accordance with an embodiment of the present invention.

FIG. 11a is a flowchart illustrating a method for processing initiator I/O requests in accordance with a first embodiment of the present invention.

FIG. 11b is a flowchart illustrating a method for processing command completions in accordance with a first embodiment of the present invention.

FIG. 12a is a flowchart illustrating a method for processing initiator I/O requests in accordance with a second embodiment of the present invention.

FIG. 12b is a flowchart illustrating a method for processing command completions in accordance with a second embodiment of the present invention.

FIG. 13a is a flowchart illustrating a method for processing initiator I/O requests in accordance with a third embodiment of the present invention.

FIG. 13b is a flowchart illustrating a method for processing command completions in accordance with a third embodiment of the present invention.

FIG. 14a is a flowchart illustrating a method for processing initiator I/O requests in accordance with a fourth embodiment of the present invention.

FIG. 14b is a flowchart illustrating a method for processing command completions in accordance with a fourth embodiment of the present invention.

FIG. 15 is a flowchart illustrating a method for processing initiator I/O requests in accordance with a fifth embodiment of the present invention.

FIG. 16 is a table illustrating an exemplary method for managing target port queue depth for two initiators in accordance with an embodiment of the present invention.

DETAILED DESCRIPTION

The present invention is directed to the problem of increasing initiator queue depth while maintaining maximum target port queue depth and maximum controller queue depth. In the conventional art, target ports have a maximum queue depth and support a maximum number of simultaneous connections. For example, target ports may have a maximum queue depth of 512, and can support up to 64 simultaneous connections. Conventional art targets generally allocate queue depth per initiator by dividing the target port maximum queue depth by the maximum number of simultaneous connections. In the above example, this means that each initiator would have a queue depth of 512 divided by 64, or eight—regardless of the number of initiators currently logged into the target port. While this may be fairly efficient when the maximum number of simultaneous connections is reached, it is very inefficient for a small number of logged in initiators since a significant amount of target port queue depth is wasted. What is needed, therefore, is a more efficient means of allocating available target port queue depth and controller queue depth to logged-in initiators.

The present invention is directed to the problem of increasing initiator queue depth while maintaining maximum target port queue depth and maximum controller queue depth. By increasing initiator queue depth, greater target port or controller bandwidth is allocated to logged-in initiators.

Figure 1A:
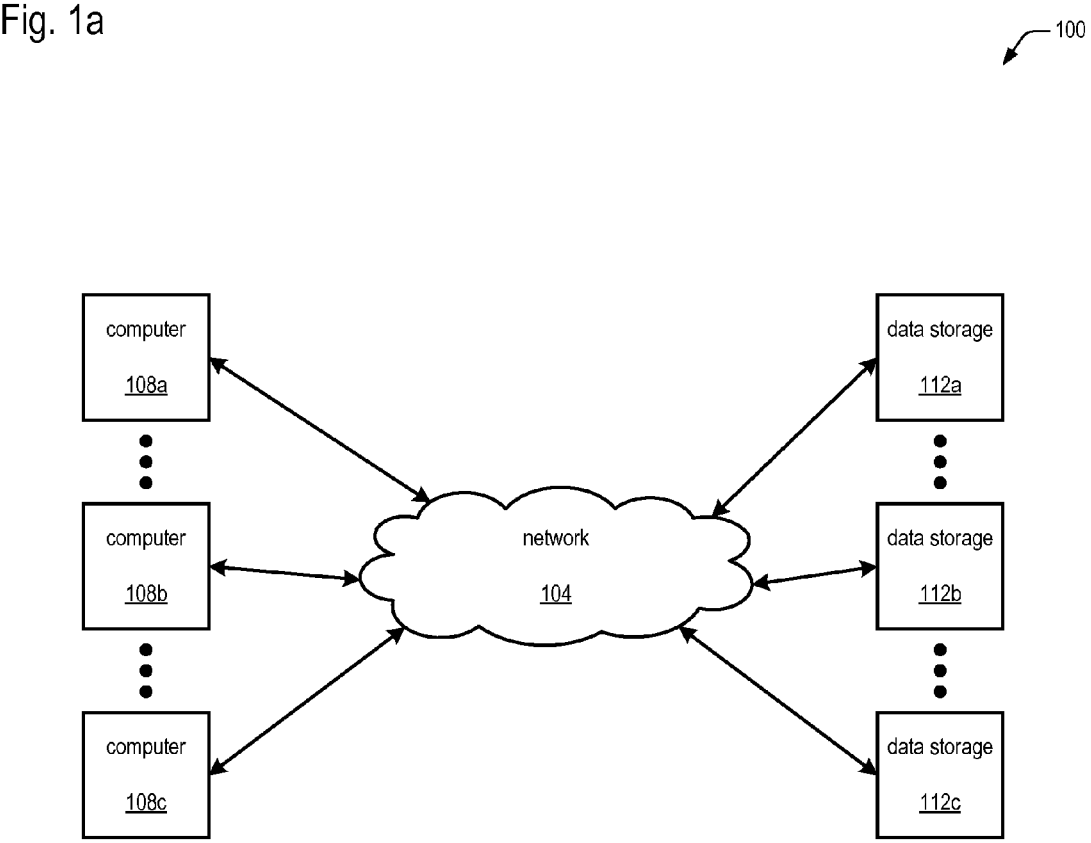
FIG. 1a is a block diagram illustrating components of a data storage network in accordance with embodiments of the present invention.
Figure 1A:
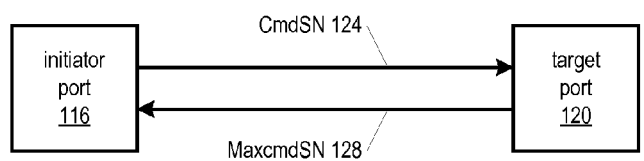

Referring now to FIG. 1a, a block diagram 100 illustrating components of a data storage network in accordance with embodiments of the present invention is shown. Network 104 is any suitable data storage network that supports flow control within the data storage network protocol. For example, data storage network 104 may be an ATM or iSCSI network. In a preferred embodiment data storage network 104 is an iSCSI network.

Data storage network 104 includes one or more computers 108a, 108b, 108c. Computers 108 are host computers that generate I/O requests, where I/O requests are reads and writes. Computers 108 may be servers, desktop computers, or portable computers including tablet computers and PDAs.

Data storage network 104 also includes one or more data storage systems 112a, 112b, 112c. Data storage systems 112 include data storage subsystems having one or more data storage controllers, and one or more storage devices. In some embodiments, data storage systems 112 have redundant controllers and/or redundant array of inexpensive disks (RAID) technology. Data storage systems 112 receive I/O requests from computers 108, and store data to storage device(s)/retrieve data from storage device(s) in response. Data storage devices include, but are not limited to, hard disk drives, tape drives, optical drives, and solid state disks. In the context of data storage network 104, computers 108 each have one or more initiator ports and data storage systems 112 each have one or more target ports. However, it should be understood that computers 108 may also have target ports, and data storage systems 112 may also have initiator ports.

Referring now to FIG. 1b, a block diagram illustrating target and initiator flow control for an Internet SCSI (iSCSI) connection in accordance with embodiments of the present invention is shown. ISCSI utilizes a flow control protocol between the initiator port 116 and the target port 120. Initiator port 116 provides a command sequence number (cmdSN) 124 to the target port 120, where the command sequence number reflects the current I/O request transmitted during a current session from the initiator port 116 to the target port 120. The target port 120 transfers a maximum command sequence number (maxcmdSN) 128 to the initiator port 116, where the maximum command sequence number 128 communicates to the initiator port 116 how many more I/O requests the target port 120 can accept. Therefore the maximum command sequence number 128 indicates the queue depth available to the initiator port 116 at the target port 120.

Figure 2A:
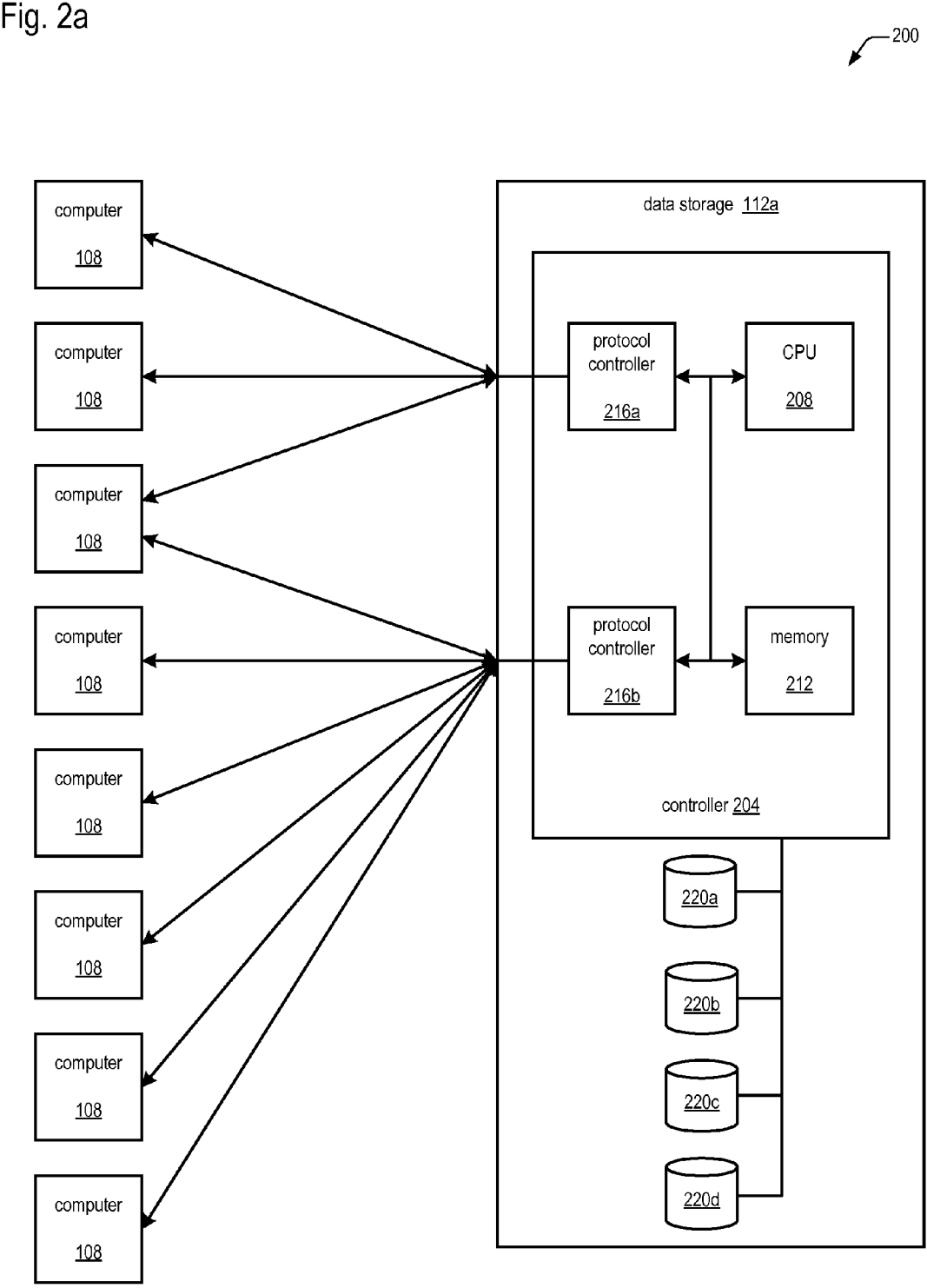
FIG. 2a is a block diagram illustrating components of a first data storage system in accordance with embodiments of the present invention.

Referring now to FIG. 2a, a block diagram 200 illustrating components of a first data storage system 112a in accordance with embodiments of the present invention is shown. The first data storage system 112a includes one or more controllers 204, which processes I/O requests from computers 108 to storage devices 220. In one embodiment, controller 204 is a RAID controller.

Controller 204 includes a CPU 208, which executes programs stored within controller 204. Controller 204 includes memory 212, which includes volatile memory, non-volatile memory, or both. Memory 212 stores programs utilized by CPU 208, configuration information, read data from storage devices 220, and write data to storage devices 220. Memory 212 also stores I/O request queues for each logged in initiators 116 of computers 108.

Controller 204 also includes one or more protocol controllers 216a, 216b. Protocol controllers 216a, 216b provide interfaces to data storage network 104 in the form of one or more target ports 120. For simplicity, the storage network 104 is not shown in FIG. 2a, and each protocol controller 216a, 216b includes one target port 120. However, it should be understood that a protocol controller 216 may have more than one target port 120.

FIG. 2a illustrates three computers 108 logged into the target port 120 of protocol controller 216a, and six computers 108 logged into the target port 120 of protocol controller 216b. One computer 108 has an initiator port 116 logged into the target port 120 of protocol controller 216a, and another initiator port 116 logged into the target port 120 of protocol controller 216b. The total number of computers 108 logged into any target port 120 cannot exceed the maximum number of simultaneous connections supported by the target port 120.

Figure 2B:
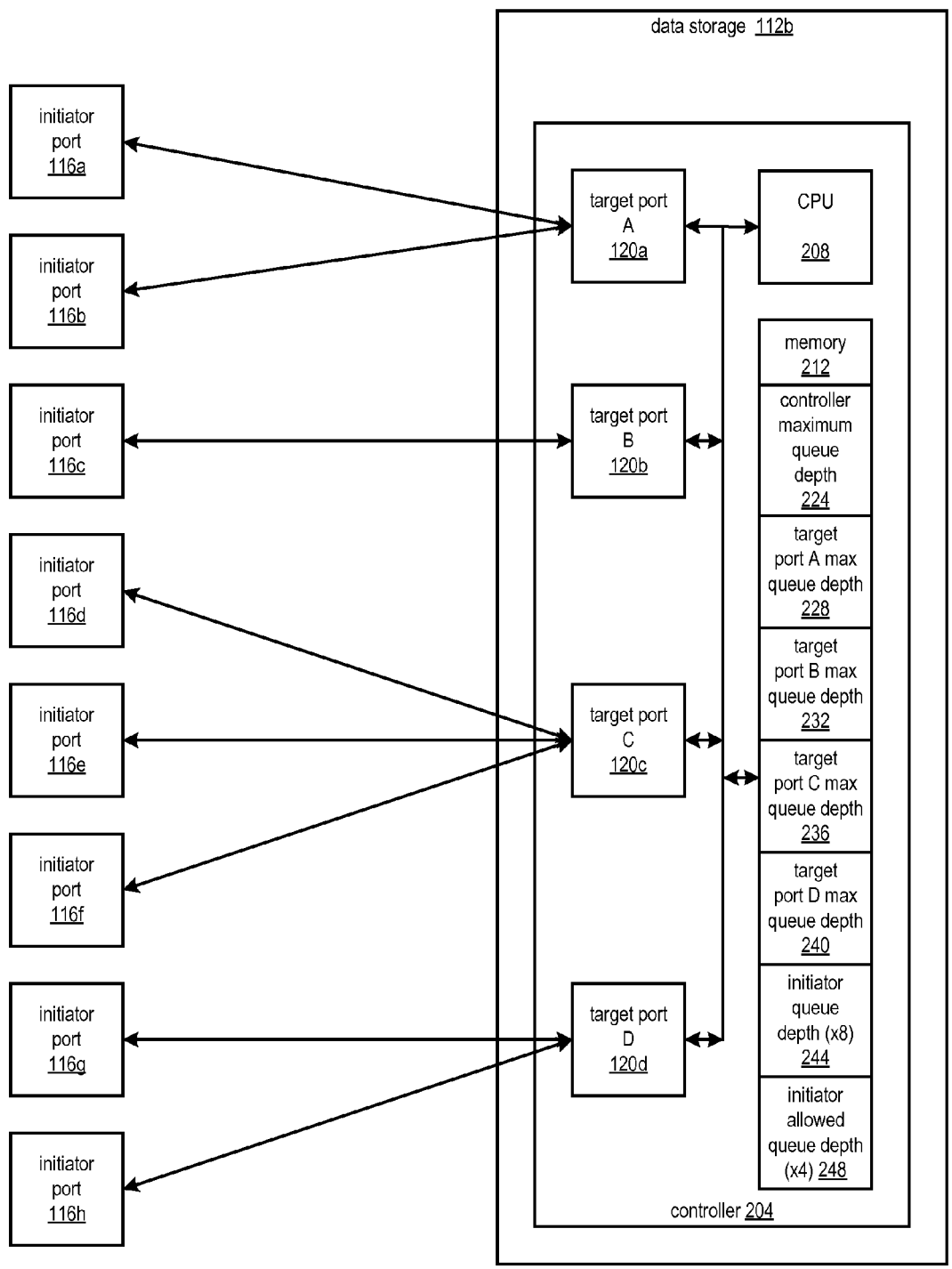
FIG. 2b is a block diagram illustrating components of a second data storage system in accordance with embodiments of the present invention.

Referring now to FIG. 2b, a block diagram illustrating components of a second data storage system 112b in accordance with embodiments of the present invention is shown. Data storage system 112b includes a CPU 208 and a memory 212, and four target ports 120, including target port A 120a, target port B 120b, target port city 120c, and target port 120d. Target ports 120a, 120b, 120c, and 120d may be in a single protocol controller 216 containing four target ports 120, or in up to four protocol controllers 216 each containing a single target port 120.

Initiator ports 116 are within computers 108. One initiator port 116 may be within a single computer 108, or multiple initiator ports 116 may be within a single computer 108. In the system of FIG. 2b, initiator ports 116a and 116b are logged into target port A 120a, initiator port 116c is logged into target port B 120b, initiator ports 116d, 116e, and 116f are logged into target port C 120c, and initiator ports 116g and 116h are logged into target port D 120d.

Memory 212 includes various parameters used by CPU 208 to manage flow control in each of target port A 120a, target port B 120b, target port C 120c, and target port D 120d. Memory 212 includes a controller maximum queue depth 224, which specifies the maximum queue depth across all target ports 120 of controller 204. Controller maximum queue depth 224 reflects the combined queue depth of target ports 120, the size of memory 212, and the processing power of CPU 208.

Each target port 120 has an associated maximum queue depth or maximum port queue depth. Target port A 120a has target port A maximum queue depth 228, target port B 120b has target port B maximum queue depth 232, target port C 120c has target port C maximum queue depth 236, and target port D 120d has target port D maximum queue depth 240. Target port maximum queue depths are generally vendor-specified, and reflect memory 212 and processing resources 208 within the protocol controller 216 containing the target port 120.

Memory 212 also includes in initiator queue depth 244 for each logged-in initiator port 116. In FIG. 2b, there are eight logged-in initiator ports 116a through 116h. Therefore, there are eight initiator queue depths 244 in memory 212. Initiator queue depth 244 stores the current queue depth for each initiator port 116.

Finally, memory 212 includes an initiator allowed queue depth 248 for each target port 120. In the preferred embodiment, initiator allowed queue depth 248 depends on the current number of logged-in initiator ports 116. In other embodiments, there may be more than one initiator allowed queue depth 248 per target port 120, such as an initiator allowed queue depth 248 per logged-in initiator port 116.

Figure 3:
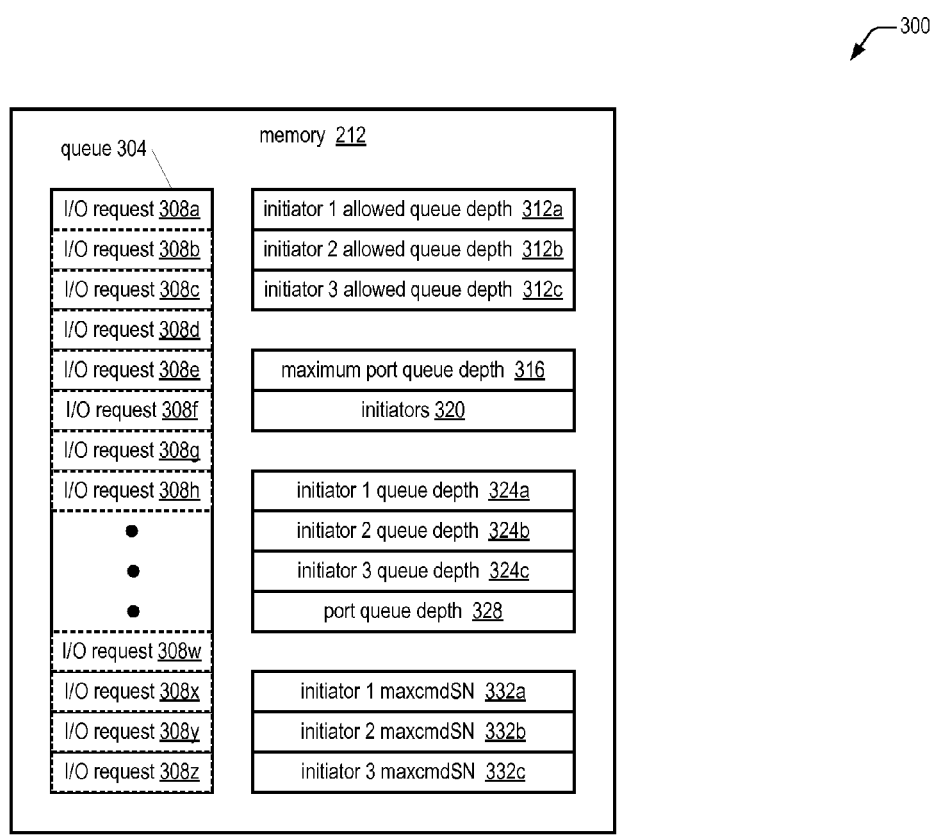
FIG. 3 is a block diagram illustrating memory components of a three initiator electronic data storage system in accordance with embodiments of the present invention.

Referring now to FIG. 3, a block diagram 300 illustrating memory 212 components of a three initiator port 116 electronic data storage system 112 in accordance with embodiments of the present invention is shown. Memory 212 includes a queue 304, which includes a plurality of I/O requests 308. In one embodiment, there is a single queue 304 to store all pending I/O requests 308 per target port 120 or controller 204. In a preferred embodiment, memory 212 includes a separate queue 304 per logged-in initiator port 116 per target port 120.

Memory 212 includes an allowed queue depth 312 for each logged-in initiator port 116. Therefore, initiator 1 has initiator 1 allowed queue depth 312a, initiator 2 has initiator 2 allowed queue depth 312b, and initiator 3 has initiator 3 allowed queue depth 312c. Initiator allowed queue depth 312 is the maximum queue depth for the corresponding initiator port 116. In one embodiment initiator allowed queue depths 312 are the same for all initiator ports 116 logged into the same target port 120. In other embodiments, initiator allowed queue depths 312 are different for one or more initiator ports 116 logged into the same target port 120.

Memory 212 includes maximum port queue depth 316. Maximum port queue depth 316 is a parameter specified by the protocol controller 216 manufacturer, and specifies the total queue depth available to all logged-in initiator ports 116 of the target port 120 within the protocol controller 216.

Initiators 320 are the number of initiator ports 116 currently logged into the target port 120. CPU 208 detects a login or logout of an initiator port 116, and in response updates initiators 320 to reflect the new current number of logged-in initiator ports 116. In some embodiments, the current number of logged-in initiator ports determines initiator allowed queue depth 312 for one or more initiator ports 116.

Initiator queue depth 324 is the current queue depth for each logged-in initiator port 116. Initiator queue depth 324 increments for each new I/O request received by the target port 120, and decrements for each I/O request completed by controller 204. Initiator queue depth 324 will typically be different for each logged-in initiator port 116, since each initiator port 116 has different I/O requirements to the data storage system 112.

Memory 212 includes port queue depth 328, which is the sum of the initiator queue depths 324 for all currently logged-in initiator ports 116. Port queue depth 328 is compared to maximum port queue depth 316 by CPU 208 in order to determine if the target port 120 has a queue full condition, or not. If the port queue depth 328 is less than the maximum port queue depth 316, then the target port 120 is able to accept a number of new I/O requests equal to the difference between the port queue depth 328 and the maximum port queue depth 316. If the port queue depth 328 is equal to the maximum port queue depth 316 the target port 120 is unable to accept new I/O requests until one or more of the I/O requests 308 in queue 304 completes. In the latter case, a queue full condition is transmitted from the target port 120 to the requesting initiator port 116.

Memory 212 also maintains a maximum command sequence number (maxcmdSN) 332 for each logged-in initiator port 116. The maximum command sequence number 332 is typically different for each logged-in initiator port 116, and is returned independently to each logged-in initiator port 116 in order to communicate how many additional I/O requests may be sent to the target port 120.

It should be understood that the parameters illustrated in FIG. 3 are generally per target port 120, and a separate set of parameters and queue 304 is usually provided in the memory 212 for each target port 120.

Referring now to FIG. 4a, a block diagram illustrating initiator allowed queue depth 312 for the case of one initiator port 116 login in accordance with embodiments of the present invention is shown. The target port 120 has a maximum port queue depth 316. In the case of one initiator port 116, initiator 1 allowed queue depth 312a is equal to the maximum port queue depth 316 since initiator 1 does not need to compete for target port 120 queue depth resources with any other initiator port 116.

Referring now to FIG. 4b, a block diagram illustrating initiator allowed queue depth 312 for the case of two initiator port 116 logins in accordance with embodiments of the present invention is shown. The target port 120 has a maximum port queue depth 316, and in the case of two initiators 116, initiator 1 allowed queue depth 312a is equal to half of the maximum port queue depth 316 and initiator 2 allowed queue depth 312b is equal to half of the maximum port queue depth 316. FIG. 4b illustrates a case in which the maximum port queue depth 316 is evenly divided between all currently logged-in initiator ports 116.

Referring now to FIG. 4c, a block diagram illustrating initiator allowed queue depth 312 for the case of three initiator port 116 logins in accordance with embodiments of the present invention is shown. The target port 120 has a maximum port queue depth 316, and in the case of three initiator ports 116, initiator 1 allowed queue depth 312a is equal to one third of the maximum port queue depth 316, initiator 2 allowed queue depth 312b is equal to one third of the maximum port queue depth 316, and initiator 3 allowed queue depth 312c is equal to one third the maximum port queue depth 316. FIG. 4c illustrates a case in which the maximum port queue depth 316 is evenly divided between all currently logged-in initiator ports 116.

Referring now to FIG. 5a, a block diagram illustrating target port queue depth for two initiator port 116 logins in accordance with a first embodiment of the present invention is shown. FIG. 5a represents the same case illustrated in FIG. 4b, or two initiator ports 116 are logged into the same target port 120. Maximum port queue depth 316 is divided into equal regions of initiator 1 allowed queue depth 312a, and initiator 2 allowed queue depth 312b. Initiator 1 queue depth 324a is equal to initiator 1 allowed queue depth 312a, resulting in a queue full status returned to initiator 1 for any new I/O requests 308. Initiator 2 queue depth 324b is less than an initiator 2 allowed queue depth 312b, resulting in available target port 120 queue depth 504 for initiator 2.

Referring now to FIG. 5b, a block diagram illustrating target port queue depth for two initiator port 116 logins in accordance with a second embodiment of the present invention is shown. FIG. 5b represents an embodiment whereby an initiator port 116 may borrow available queue depth from another initiator port 116 logged into the same target port 120, provided the other initiator port 116 has available queue depth. Maximum port queue depth 316 is divided into equal regions of initiator 1 allowed queue depth 312a, and initiator 2 allowed queue depth 312b. When initiator 1 queue depth 324a is equal to initiator 1 allowed queue depth 312a, instead of returning a queue full status automatically as illustrated in FIG. 5a, initiator 1 borrows queue depth 508 from initiator 2's available target port queue depth 504. This temporarily increases initiator one queue depth 324a beyond initiator one allowed queue depth 312a, and allows initiator 1 to temporarily have more outstanding I/O requests 308 than in the embodiment of FIG. 5a.

Referring now to FIG. 6a, a block diagram illustrating a first phase of transfer of target port queue depth for two port logins in accordance with an embodiment of the present invention is shown. The embodiment illustrated in FIGS. 6a and 6b allows available queue depth of one target port 120 to be transferred to another target port 120 in the event that an initiator port 116 logged into the other target port 120 requires additional queue depth beyond a specified limit. A first target port 120, target port 1, has a maximum port 1 queue depth 316a, and a second target port 120, a target port 2, as a maximum port 2 queue depth 316b. A first predetermined queue depth 604 has been established for a first initiator port 116 logged into the target port 1. A second predetermined queue depth 612 has been established for a second initiator port 116 logged into target port 2. In the event the second initiator port 116 requires additional queue depth beyond second predetermined queue depth 612, the controller 204 transfers port 1 queue depth to port 2 queue depth 608, as long as target port 1 has additional queue depth remaining below maximum target port 1 queue depth 316a and target port 2 has additional queue depth less than maximum port 2 queue depth 316b which is less than or equal to the amount of transferred queue depth 608.

Referring now to FIG. 6b, a block diagram illustrating a second phase of transfer of target port queue depth for two initiator port 116 logins in accordance with an embodiment of the present invention is shown. FIG. 6b illustrates the target port 1 queue depth and target port 2 queue depth after the queue depth transfer 608 of FIG. 6a has occurred. The maximum target port 1 queue depth 316a is reduced by the transferred queue depth 608, such that the maximum target port 1 queue depth 316a equals the first predetermined queue depth 604. Similarly, the second predetermined queue depth 612 has been increased by the amount of queue depth in queue depth transfer 608. At this point, no more queue depth is able to be transferred from target port 1 to target port 2 since the maximum port 1 queue depth 316 a has been reached.

Referring now to FIG. 7, a block diagram illustrating port queue depth across the target ports 120 of a controller 204 in accordance with an embodiment of the present invention is shown. A controller 204 has a controller queue depth, which is divided up across all target ports 120 of the controller 204. In the example of FIG. 7, the controller 204 has four target ports 120: target port 1 through target port 4. Target port 1 is shown with 3 initiator ports 116 logged in, each initiator port 116 having its own queue depth. Initiator 1 has initiator 1 queue depth 324a, initiator 2 has initiator 2 queue depth 324b, and initiator 3 has initiator 3 queue depth 324c. The sum of initiator 1, initiator 2, and initiator 3 queue depths is less than the maximum queue depth for target port 1. Therefore, available target port 1 queue depth 704 remains.

Target port 2 is shown with a single initiator port 116 logged in. Initiator 4 has initiator 4 queue depth 324d, and initiator 4 queue depth 324d is less than the maximum queue depth for target port 2. Therefore available target port 2 queue depth 708 remains.

Target port 3 is shown with no initiator ports 116 logged in. Therefore available target port 3 queue depth 712 remains.

Target port 4 is shown with 2 initiators logged in. Initiator 5 has initiator 5 queue depth 324d, and initiator 6 has initiator 6 queue depth 324f. The sum of initiator 5 and initiator 6 queue depths is less than the maximum queue depth for target port 4. Therefore available target port 4 queue depth 716 remains.

The controller 204 keeps track of each target port queue depth, in addition to the controller queue depth. If the sum of initiator 1 queue depth 324a, initiator 2 queue depth 324b, initiator 3 queue depth 324c, initiator 4 queue depth 324d, initiator 5 queue depth 324e, and initiator 6 queue depth 324f is less than the maximum controller queue depth, and available controller queue depth 720 remains. Available controller queue depth 720 is equal to the sum of available target port 1 queue depth 704, available target port 2 queue depth 708, available target port 3 queue depth 712, and available target port 4 queue depth 716.

Referring now to FIG. 8, a block diagram illustrating guaranteed initiator queue depth managed to port queue depth in accordance with an embodiment of the present invention is shown. The embodiment of FIG. 8 illustrates a case where a specified initiator port 116 has a guaranteed queue depth, such that regardless of the queue depths allocated to other initiator ports 116 the specified initiator port 116 always has access to the full amount of the guaranteed queue depth.

The target port 120 of FIG. 8 has a maximum port queue depth 316. Initiator 1 has guaranteed first initiator queue depth 804, which is always available to initiator 1. All other initiator ports 116 other than initiator 1 are required to divide up queue depth out of remaining total initiator port queue depth 812, which is the difference between a maximum port queue depth 316 and guaranteed first initiator queue depth 804.

Initiator 1 has initiator 1 queue depth 324a, which is less than guaranteed first initiator queue depth 804. Therefore first initiator reserved queue depth 808 remains, which is the difference between the guaranteed first initiator queue depth 804 and initiator 1 queue depth 324a.

Initiator 2 has initiator 2 queue depth 324b, and initiator 3 has initiator 3 queue depth 324c. If the sum of initiator 2 queue depth 324b and initiator 3 queue depth 324c is less than the remaining total initiator port queue depth 812, then remaining total initiator port queue depth 816 is available. Remaining other initiator port queue depth 816 may be used for initiator 2, initiator 3, or any other initiators 116 beyond initiator 3 that log into the target port 120.

Referring now to FIG. 9, a block diagram illustrating guaranteed initiator queue depth managed to controller queue depth in accordance with an embodiment of the present invention is shown. In the embodiment of FIG. 9, a controller 204 has two target ports 120, each with a separate queue depth. The controller 204 has a maximum controller queue depth 904, which is available to divide up between the two target ports 120.

Target port 1 has a single initiator port 116 logged-in, and initiator 1 has initiator 1 queue depth 324a. Initiator 1 has assigned a corresponding guaranteed first initiator queue depth 804, which is always available to initiator 1 regardless of how many initiator ports 116 are logged into target port 1. If initiator 1 queue depth 324a is less than guaranteed first initiator queue depth 804, then first initiator reserved queue depth 808 is available to the first initiator.

Target port 2 has two initiators logged-in. Initiator 2 has initiator 2 queue depth 324b, and initiator 3 has initiator 3 queue depth 324c. The controller 204 calculates a total initiator queue depth 912, which is the sum of initiator 1 queue depth 324a, initiator 2 queue depth 324b, and initiator 3 queue depth 324c. The controller 204 maps the total initiator queue depth 912 and the first initiator reserved queue depth 808 to the maximum controller queue depth 904. The controller calculates the remaining controller queue depth 908, which is available to the logged-in initiator ports 116.

In one embodiment, the remaining controller queue depth 908 is available only to initiator 2, initiator 3, or and in any initiator ports 116 beyond initiator 3 that are logged into the controller 204. In a second embodiment, the remaining controller queue depth 908 is available to any initiator ports 116 logged into the controller 204, including initiator 1 when initiator 1 requires more queue depth then the guaranteed first initiator queue depth 804.

Referring now to FIG. 10a, a flowchart illustrating a method for managing a new initiator port 116 login in accordance with an embodiment of the present invention is shown. Flow begins at block 1004.

At block 1004, the controller 204 detects a new initiator port 116 login on a target port 120. A new login is required prior to a new initiator port 116 transmitting or receiving data on the target port 120. Flow proceeds to block 1008.

At block 1008, the controller 204 increments a number representing the number of initiator ports 116 currently logged-into the target port 120. This updates a count 320 to reflect the current number of initiator ports 116 logged-into the target port 120. Flow proceeds to block 1012.

At block 1012, the controller 204 calculates an initiator allowed queue depth 312. The initiator allowed queue depth 312 is equal to the maximum port queue depth 316 for the target port 120 divided by the current number logged in initiator ports 320 into the target port 120. This calculation divides up the maximum target port queue depth 316 equally among all logged in initiator ports 116. Flow proceeds to block 1016.

At block 1016, the controller 204 calculates an initiator maximum command sequence number (maxcmdSN) 332 for the new initiator port 116 that logged into the target port 120. The initiator maxcmdSN 332 is equal to the initiator command sequence number (cmdSN) 124 plus initiator allowed queue depth 312. The initiator cmdSN 124 was received by the target port 120 concurrent with the new initiator port 116 login. Flow proceeds to block 1020.

At block 1020, the target (controller 204) returns initiator maxcmdSN 332 to the newly logged in-initiator port 116. Flow ends at block 1020.

Referring now to FIG. 10b, a flowchart illustrating a method for managing an initiator port 116 logout in accordance with an embodiment of the present invention is shown. Flow begins at block 1024.

At block 1024, the controller detects an initiator port 116 logout on a target port 120. Flow proceeds to block 1028.

At block 1028, the controller 204 decrements a number 320 representing the number of initiator ports 116 currently logged-into the target port 120. This updated count reflects the current number of initiator ports 116 logged into the target port 120. Flow proceeds to decision block 1032.

At decision block 1032, the controller 204 determines if the number of initiator ports currently logged into the target port 320 is equal to zero. This step eliminates the possibility of a divide by zero in block 1040 if no initiator ports 116 are currently logged into the target port 120. If the number of initiator ports currently logged into the target port 320 is equal to zero, then flow proceeds to block 1036. If the number of initiator ports currently logged into the target port 320 is not equal to zero, then flow proceeds to block 1040.

At block 1036, the controller 204 sets the initiator allowed queue depth 312 to be equal to the maximum port queue depth 316. At this point, no initiator ports 116 are currently logged into the target port 120, and the next initiator port 116 that logs into the target port 120 has access to the maximum port queue depth 316. Flow ends at block 1036.

At block 1040, the controller 204 sets the initiator allowed queue depth 312 to be the maximum port queue depth 316 divided by the number of currently logged in initiator ports to the target port 320. This establishes a new initiator allowed queue depth 312 based on an updated number of currently logged-in initiator ports 320. Flow ends at block 1040.

Referring now to FIG. 11a, a flowchart illustrating a method for processing initiator I/O requests 308 in accordance with a first embodiment of the present invention is shown. This embodiment reflects a first portion of the preferred embodiment of the present invention. Flow begins at block 1104.

At block 1104, a target port 120 receives one or more new I/O requests 308 from an initiator port 116. Flow proceeds to decision block 1108.

At decision block 1108, the controller 204 determines if the port queue depth 328 is equal to the maximum port queue depth 316. The port queue depth 328 is the sum of the current initiator queue depths 324 for all initiator ports 116 logged into the target port 120. If the port queue depth 328 is equal to the maximum port queue depth 316, then flow proceeds to block 1112. If the port queue depth 328 is not equal to the maximum port queue depth 316, then flow proceeds to block 1116.

At block 1112, the target port 120 returns a queue full and maxcmdSN 332 to the initiator port 116. The target port 120 is not able to accept the new I/O request(s) 308 since the maximum port queue depth 316 has been reached. Flow ends at block 1112.

At block 1116, the controller 204 places the new I/O request(s) 308 on the queue 304. Once the new I/O request(s) 308 are placed on the queue 304, the controller 204 may begin processing the new I/O request(s) 308. Flow proceeds to block 1120.

At block 1120, the controller 204 sets the initiator queue depth 324 to be the initiator queue depth 324 plus the number of new I/O requests 308 received from the initiator port 116. This step updates the current queue depth for the initiator 324. Flow proceeds to block 1124.

At block 1124, the controller 204 sets the initiator maxcmdSN 332 to be the initiator cmdSN 124 plus the initiator allowed queue depth 312 minus the current initiator queue depth 324. Flow ends at block 1124.

Referring now to FIG. 11b, a flowchart illustrating a method for processing command completions in accordance with a first embodiment of the present invention. This embodiment reflects a second portion of the preferred embodiment of the present invention. Flow begins at block 1128.

At block 1128, one or more new I/O request(s) 308 from the initiator port 116 complete. Flow proceeds to block 1132.

At block 1132, the controller 204 sets the initiator queue depth 324 to be the initiator queue depth 324 minus the number of completed I/O request(s) 308. This frees up more queue depth for the initiator 324, in order to accept more new I/O request(s) 308. Flow proceeds to block 1136.

At block 1136, the controller 204 sets the initiator maxcmdSN 332 to be the initiator cmdSN 124 plus the initiator allowed queue depth 312 minus the initiator current queue depth 324. Flow proceeds to block 1140.

At block 1140, the target port 120 returns the initiator maxcmdSN 332 to the initiator port 116. Flow ends at block 1140.

Referring now to FIG. 12*a*, a flowchart illustrating a method for processing initiator I/O requests 308 in accordance with a second embodiment of the present invention is shown. Flow begins at block 1204.

At block 1204, the target port 120 receives one or more new I/O request(s) 308 from an initiator port 116. Flow proceeds to decision block 1208.

At decision block 1208, the controller 204 determines if the port queue depth 328 is equal to the maximum port queue depth 316. If the port queue depth 328 is equal to the maximum port queue depth 316, then flow proceeds to block 1212. If the port queue depth 328 is not equal to the maximum port queue depth 316, then flow proceeds to block 1216.

At block 1212, the target port 120 returns a queue full and initiator maxcmdSN 332 to the initiator port 116. Flow ends at block 1212.

At block 1216, the controller 204 places the new I/O request(s) 308 on the queue 304. Flow proceeds to block 1220.

At block 1220, the controller 204 sets the initiator queue depth 324 to be the initiator queue depth 324 plus the number of new I/O request(s) 308 from the initiator port 116. Flow proceeds to block 1224.

At block 1224, the controller 204 sets the initiator maxcmdSN 332 to be the initiator cmdSN 124+the maximum port queue depth 316 minus the port queue depth 328. Flow ends at block 1224.

Referring now to FIG. 12*b*, a flowchart illustrating a method for processing command completions in accordance with a second embodiment of the present invention is shown. Flow begins at block 1228.

At block 1228, one or more new I/O request(s) 308 from the initiator port 116 complete. Flow proceeds to block 1232.

At block 1232, the controller 204 sets the initiator queue depth 324 to be the initiator queue depth 324 minus the number of completed I/O request(s) 308. This frees up more queue depth 324 for the initiator port 116, in order to accept more new I/O request(s) 308. Flow proceeds to block 1236.

At block 1236, the controller 204 sets the initiator maxcmdSN 332 to be initiator cmdSN 124 plus the maximum port queue depth 316 minus the port queue depth 328. Flow proceeds to block 1240.

At block 1240, the target port 120 returns initiator maxcmdSN 332 to the initiator port 116. Flow ends at block 1240.

Referring now to FIG. 13*a*, a flowchart illustrating a method for processing initiator I/O requests 308 in accordance with a third embodiment of the present invention is shown. Flow begins at block 1304.

At block 1304, a target port 120 receives one or more new I/O request(s) 308 from an initiator port 116. Flow proceeds to decision block 1308.

At decision block 1308, the controller 204 determines if the port queue depth 328 is equal to the maximum port queue depth 316. If the port queue depth 328 is equal to the maximum port queue depth 316, then flow proceeds to block 1312. If the port queue depth 328 is not equal to the maximum port queue depth 316, then flow proceeds to block 1316.

At block 1312, the target port 120 returns a queue full and an initiator maxcmdSN 332 to the initiator port 116. Flow ends at block 1312.

At block 1316, the controller 204 places the new I/O request(s) 308 on the queue 304. Flow proceeds to block 1320.

At block 1320, the controller 204 sets the initiator queue depth 324 to be initiator queue depth 324 plus the number of new I/O request(s) 308 from the initiator port 116. Flow proceeds to decision block 1324.

At decision block 1324, the controller 204 determines if the initiator queue depth 324 is greater than or equal to the initiator allowed queue depth 312. If the initiator queue depth 324 is greater than or equal to the initiator allowed queue depth 312, then flow proceeds to block 1332. If the initiator queue depth 324 is less than the initiator allowed queue depth 312, then flow proceeds to block 1328.

At block 1328, the controller 204 sets the initiator maxcmdSN 332 to be initiator cmdSN 124 plus the initiator allowed queue depth 312 minus the initiator queue depth 324. Flow ends at block 1328.

At block 1332, the controller 104 sets the initiator maxcmdSN 332 to be the initiator cmdSN 124 plus the maximum port queue depth 316 minus the port queue depth 328. Flow ends at block 1332.

Referring now to FIG. 13*b*, a flowchart illustrating a method for processing command completions in accordance with a third embodiment of the present invention is shown. Flow begins at block 1336.

At block 1336, one or more new I/O request(s) 308 from the initiator port 116 complete. Flow proceeds to block 1340.

At block 1340, the controller 204 sets the initiator queue depth 324 to be the initiator queue depth 324 minus the number of completed I/O requests 308. Flow proceeds to decision block 1344.

At decision block 1344, the controller 204 determines if the initiator queue depth 324 is less than the initiator allowed queue depth 312. If the initiator queue depth 324 is less than initiator allowed queue depth 312, then flow proceeds to block 1348. If the initiator queue depth 324 is not less than the initiator allowed queue depth 312, then flow proceeds to block 1352.

At block 1348, the controller 204 sets the initiator maxcmdSN 332 to be the initiator cmdSN 124 plus the initiator allowed queue depth 312 minus initiator queue depth 324. Flow proceeds to block 1352.

At block 1352, the target port 120 returns the initiator maxcmdSN 332 to the initiator port 116. Flow ends at block 1352.

Referring now to FIG. 14*a*, a flowchart illustrating a method for processing initiator I/O requests 308 in accordance with a fourth embodiment of the present invention is shown. Flow begins at block 1404.

At block 1404 a target port 120 receives one or more new I/O request(s) 308 from an initiator port 116. Flow proceeds to decision block 1408.

At decision block 1408, the controller 204 determines if the sum of the port queue depths 328 is equal to the maximum controller queue depth 904. Each target port 120 has a corresponding port queue depth 328, and the sum of the port queue depths 328 for all target ports 120 are compared to the maximum controller queue depth 904. If the sum of the port queue depths 328 is equal to the maximum controller queue depth 904, then flow proceeds to block 1412. If the sum of the port queue depths 328 is not equal to the maximum controller queue depth 904, then flow proceeds to block 1416.

At block 1412, the target port 120 returns a queue full and the maxcmdSN 332 to the initiator port 116. Flow ends at block 1412.

At block 1416, the controller 204 places the new I/O request(s) 308 on the queue 304. Flow proceeds to block 1420.

At block 1420, the controller 204 sets the initiator queue depth 324 equal to the initiator queue depth 324 plus the number of new I/O request(s) 308 from the initiator port 116. Flow proceeds to block 1424.

At block 1424, the controller 204 sets the initiator maxcmdSN 332 to be the initiator cmdSN 124 plus the maximum controller queue depth 904 minus the sum of the port queue depths 328. Flow ends at block 1424.

Referring now to FIG. 14*b*, a flowchart illustrating a method for processing command completions in accordance with a fourth embodiment of the present invention is shown. Flow begins at block 1428.

At block 1428, one or more new I/O requests 308 from the initiator port 116 complete. Flow proceeds to block 1432.

At block 1432, the controller 204 sets the initiator queue depth 324 to be initiator queue depth 324 minus the number of completed I/O request(s) 308. Flow proceeds to block 1436.

At block 1436, the controller 204 sets the initiator maxcmdSN 332 to be the initiator cmdSN 124 plus the maximum controller queue depth 904 minus the sum of the port queue depths 328. Flow proceeds to block 1440.

At block 1440, the target port 120 returns the initiator maxcmdSN 332 to the initiator port 116. Flow ends at block 1440.

Referring now to FIG. 15, a flowchart illustrating a method for processing initiator I/O requests 308 in accordance with a fifth embodiment of the present invention is shown. Flow begins at block 1504.

At block 1504, the controller 204 assigns a guaranteed initiator queue depth 804 to an initiator port 116. Flow proceeds to block 1508.

At block 1508, the controller 204 maintains a demand rate to the initiator port 116. The demand rate is the number of I/O requests 308 received from an initiator port 116 during the immediately previous predetermined time period. In one embodiment, the demand rate for initiator port 116 is measured over the immediately previous minute of time. In a second embodiment, the demand rate for initiator port 116 is measured over the immediately previous hour of time. However, demand rate may be measured over any predetermined period of time other than one minute or one hour. Flow proceeds to block 1512.

At block 1512, the target port 120 receives one or more new I/O requests 308 and a sequence identifier 124 from the initiator port 116. Flow proceeds to block 1516.

At block 1516, the controller 204 determines if the initiator current queue depth 324*a* is equal to the guaranteed initiator queue depth 804. Flow proceeds to decision block 1520.

At decision block 1520, the controller 204 determines if the initiator current queue depth 324*a* is equal to the guaranteed initiator queue depth 804. If the initiator current queue depth 320*a* is equal to the guaranteed initiator queue depth 804, then flow proceeds to block 1524. If the initiator current queue depth 324*a* is not equal to the guaranteed initiator queue depth 804, then flow proceeds to block 1528.

At block 1524, the target port 120 returns a queue full and an initiator maxcmdSN 332 to the initiator port 116. Flow proceeds to block 1540.

At block 1528, the controller 204 places the new I/O request(s) 308 on the queue 304. Flow proceeds to block 1532.

At block 1532, the controller 204 sets the initiator current queue depth 324*a* equal to the initiator current queue depth 324*a* plus the number of new I/O request(s) 308 from the initiator port 116. Flow proceeds to block 1536.

At block 1536, the controller 204 sets the initiator maxcmdSN 332 equal to the initiator cmdSN 124+the guaranteed initiator queue depth 804 minus the initiator current queue depth 324*a*. Flow proceeds to block 1540.

At block 1540, the controller 204 determines if the demand rate is less than a predetermined demand rate. The predetermined demand rate is a user-set threshold that determines when the guaranteed demand rate should be increased. Flow proceeds to decision block 1544.

At decision block 1544, the controller 204 determines if the demand rate is less than the predetermined demand rate. If the demand rate is less than the predetermined demand rate then flow proceeds to block 1548. If the demand rate is not less than the predetermined demand rate then flow proceeds to block 1552.

At block 1548, the controller 204 increases the guaranteed queue depth 804 to be less than or equal to the maximum port queue depth 316. In one embodiment, the guaranteed queue depth 804 is increased to the maximum port queue depth 316. In a second embodiment, the guaranteed queue depth 804 is increased to a level below the maximum port queue depth 316. Flow ends at block 1548.

At block 1552, the controller 204 maintains the guaranteed queue depth 804. Flow ends at block 1552.

Referring now to FIG. 16, a table illustrating an exemplary method for managing target port 120 queue depth for two initiator ports 116 in accordance with an embodiment of the present invention is shown. The example of FIG. 16 assumes a maximum port queue depth of 512.

At time zero, no initiator ports 116 are logged-into the target port 120. This situation represents the state of the target port 120 immediately following power-on of the controller 204.

At time 10, initiator 1 logs into the target port 120. Initiator 1 transmits cmdSN1 equal to zero. At time 11, the target port 120 responds with maxcmdSN1 of 512, and maintains an initiator 1 allowed queue depth of 512. This means that initiator 1 is able to have up to 512 I/O requests 308 in the queue 304 at the same time.

At time 637, initiator 1 transfers 100 new I/O requests 308 to the target port 120. By this time, cmdSN1 is 600, and the initiator 1 queue depth is 410. At time 638, the target responds with maxcmdSN1 equals 602. After the 100 new I/O requests 308 have been added to the queue 304, the new initiator 1 queue depth is 510, leaving queue space for only two more I/O requests 308—since the initiator 1 allowed queue depth is 512.

At time 639, initiator 2 logs into the target port 120. Initiator 2 transmits cmdSN2 equal to zero. At time 640, the target port 120 responds with maxcmdSN2 of 256, and maintains an initiator 2 allowed queue depth of 256. Concurrently with responding to the login of initiator 2, target port 120 also reduces the initiator 1 allowed queue depth two 256. Each of the two initiators 116 shares half of the maximum port queue depth of the target port 120.

At time 641, initiator 1 transfers 2 new I/O requests 308 to the target port 120, along with an initiator 1 cmdSN1 of 602. At time 642, the target port 120 responds with maxcmdSN1 equal to 602. Target port 120 cannot accept more I/O requests 308 from initiator 1 since the initiator 1 current queue depth (512) is greater than the initiator 1 allowed queue depth (256).

At time 700, initiator 2 transfers three new I/O requests 308 to the target port 120, along with an initiator 2 cmdSN2 of 3.

At time 701, the target port 120 responds with maxcmdSN2 of 256. At this time, the total target port 120 queue depth is 511; 508 for initiator 1 (four I/O requests 308 from initiator 1 have completed since time 642), and three I/O requests 308 from initiator 2.

At time 702, initiator 2 transfers one new I/O request 308 to the target port 120, along with an initiator 2 cmdSN2 of 4. At time 703, the target port 120 responds with maxcmdSN2 of 256. At this time, the total target port 120 queue depth is 512; 508 for initiator 1, and four I/O requests 308 from initiator 2.

At time 704, initiator 2 transfers 20 new I/O requests 308 to the target port 120, along with an initiator 2 cmdSN2 of 24. At time 705, the target port 120 responds with maxcmdSN2 of 276, along with a queue full indication. The queue full indication is returned to initiator 2 since the target port queue depth was at 512.

At time 1300, several I/O's have completed for initiator 1, resulting in an initiator 1 queue depth of 259. At time 1301, another I/O has completed for initiator 1 resulting in initiator 1 queue depth of 258. The controller 204 manages the initiator 1 queue depth down until it reaches 256 or lower. Therefore, the target port 120 returns a maxcmdSN1 of 602 to initiator 1, and a maxcmdSN2 of 277 to initiator 2.

At time 1302, another I/O completes for initiator 1 resulting in initiator 1 queue depth of 257. At time 1303, another I/O completes for initiator 1 resulting in initiator 1 queue depth of 256, and an I/O completes for initiator 2 resulting in initiator to queue depth of 278. The controller 204 continues to manage the initiator 1 queue depth down until it reaches 256 or lower and simultaneously expands the initiator 2 queue depth. Therefore, the target port 120 returns a maxcmdSN1 of 602 to initiator 1, and a maxcmdSN2 of 278 to initiator 2.

At time 1304, the target port 120 returns a maxcmdSN1 of 602 to initiator 1, and a maxcmdSN2 of 279 to initiator 2 after another I/O completes for an initiator 2. At time 1305, another I/O completes for initiator 1, resulting in an initiator 1 queue depth of 255. Since the initiator 1 queue depth has been managed below the initiator 1 allowed queue depth of 256, the target port 120 returns to initiator 1 a maxcmdSN1 of 603. This allows initiator 1 to send one new I/O request 308 to the target port 120.

At time 1320, initiator 1 transfers one new I/O request 308 to the target port 120, along with a cmdSN1 of 603. At time 1321, the target port 120 responds with a maxcmdSN1 of 603 since initiator 1 is at the initiator 1 allowed queue depth of 256.

At time 1322, initiator 2 transfers 255 new I/O requests 308 to the target port 120, along with a cmdSN2 of 279 for the last of the 255 new I/O requests. This is allowed since the current queue depth for initiator 2 is one, allowing 255 new I/O requests 308 to reach the initiator 2 allowed queue depth of 256. At time 1323, the target port 120 responds with a maxcmdSN2 of 279, since initiator 2 is now at the initiator 2 allowed queue depth of 256.

At time 1324, one I/O request 308 for initiator 2 completes, freeing up a queue depth of one for initiator 2. The controller queue depth is now at 511, allocated as 256 for initiator 1 and 255 for initiator 2. At time 1325, an I/O request 308 completes for initiator 1 resulting in the target port 120 transferring a maxcmdSN1 of 604 to initiator 1.

The example illustrated in FIG. 16 is representative of an embodiment that manages queue depths for multiple initiator ports 116 to a maximum port queue depth 316. Other embodiments as described herein as shown in other figures herein illustrate other operation based on controller queue depth, guaranteed queue depth, and demand rate.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method for maximizing I/O requests to a target port, comprising:
   obtaining, by a controller comprising the target port, an initiator allowed queue depth;
   receiving, by the target port, a new I/O request and a current sequence identifier from a first initiator logged into the target port, wherein the initiator allowed queue depth is the maximum number of outstanding I/O requests the target port can accept for the first initiator; and
   determining, by the controller, if the initiator allowed queue depth is equal to a first queue depth, wherein the first queue depth corresponds to the first initiator;
   if the initiator allowed queue depth is equal to the first queue depth then returning, by the controller, a queue full indication and a maximum sequence identifier to the first initiator, wherein the maximum sequence identifier is equal to the current sequence identifier from the first initiator;
   if the initiator allowed queue depth is not equal to the first queue depth then:
   placing, by the controller, the new I/O request on a queue;
   incrementing, by the controller, the first queue depth; and
   adjusting, by the controller, the maximum sequence identifier, wherein adjusting the maximum sequence identifier comprises:
   adding the current sequence identifier to the initiator allowed queue depth; and
   subtracting the first queue depth from the sum of the current sequence identifier and the initiator allowed queue depth.

2. The method of claim 1, wherein the controller obtains the initiator allowed queue depth in response to an initiator logging into or logging out of the target port.

3. The method of claim 2, further comprising:
   completing, by the controller, the new I/O request;
   reducing, by the controller, the first queue depth, wherein reducing the first queue depth comprises subtracting the new I/O request from the first queue depth;
   adjusting, by the controller, the maximum sequence identifier; and
   sending the maximum sequence identifier, by the controller, to the first initiator.

4. The method of claim 2, wherein the new I/O request is a plurality of new I/O requests, wherein determining comprises:
   if the initiator allowed queue depth is equal to the first queue depth then returning, by the controller, the queue full indication and the maximum sequence identifier to the first initiator; and
   if the initiator allowed queue depth is not equal to the first queue depth then:
   placing on the queue, by the controller, the plurality of new I/O requests;
   incrementing, by the controller, the first queue depth by the number of I/O requests in the plurality of new I/O requests; and
   adjusting, by the controller, the maximum sequence identifier.

5. The method of claim 2, wherein a plurality of initiators comprising the first initiator are logged into the target port, wherein if the initiator allowed queue depth is equal to the first queue depth:
- if the sum of the queue depths of each of the plurality of initiators is equal to the maximum queue depth for the target port:
  returning, by the controller, the queue full indication and the maximum sequence identifier to the first initiator; and
- if the sum of the queue depths of each initiator of the plurality of initiators is less than the maximum queue depth for the target port:
  foregoing returning, by the controller, the queue full indication to the first initiator;
  placing, by the controller, the new I/O request on the queue;
  incrementing, by the controller, the first queue depth; and
  modifying, by the controller, the maximum sequence identifier, wherein modifying the maximum sequence identifier comprises adding the current sequence identifier to the maximum queue depth for the target port and subtracting the sum of the queue depths of each of the plurality of initiators.

6. The method of claim 2, wherein the controller comprises a plurality of target ports comprising the target port;
- if no initiators are logged into the target port, setting, by the controller, the maximum queue depth for the target port to zero; and
- if at least one initiator is logged into the target port, setting, by the controller, the maximum queue depth for the target port to a maximum queue depth for the controller divided by the number of target ports in the plurality of target ports having at least one initiator logged in.

7. The method of claim 5, wherein if at least one initiator is logged into the target port:
reducing the maximum queue depth for the target port to a predetermined queue depth if the maximum queue depth for the target port exceeds the predetermined queue depth.

8. The method of claim 5, wherein if at least the first initiator is logged into a first target port comprising a first predetermined queue depth and a second initiator is logged into a second target port comprising a second predetermined queue depth:
increasing the maximum queue depth for the second target port by the difference between the maximum queue depth for the first target port and the first predetermined queue depth, wherein the maximum queue depth for the first target port is greater than the first predetermined queue depth, wherein the difference between the maximum queue depth for the first target port and the first predetermined queue depth is not greater than the second predetermined queue depth; and
after increasing the maximum queue depth for the second target port:
reducing the maximum queue depth for the first target port to the first predetermined queue depth.

9. The method of claim 5, further comprising:
recalculating, by the controller, the maximum queue depth for all target ports of the controller whenever an only initiator logged into a target port of the plurality of target ports logs out of the target port; and
recalculating, by the controller, the maximum queue depth for all target ports of the controller whenever one or more initiators log into a target port of the plurality of target ports after no initiators were logged into the target port,
wherein recalculating the maximum queue depth for all target ports of the controller comprises setting the maximum queue depth for each target port to the maximum controller queue depth divided by the number of target ports with at least one initiator logged into the target port.

10. A controller that maximizes I/O requests from a plurality of initiators comprising:
a target port, wherein the target port receives I/O requests from the plurality of initiators, wherein the plurality of initiators are coupled to the target port; and
a processor, coupled to the target port, wherein the processor obtains an initiator allowed queue depth;
in response to the target port receiving a new I/O request and a current sequence identifier from a first initiator of the plurality of initiators, the processor determines if the initiator allowed queue depth is equal to a first queue depth, wherein the first queue depth corresponds to the first initiator;
if the initiator allowed queue depth is equal to the first queue depth then the controller returns a queue full indication and a maximum sequence identifier to the first initiator, wherein the maximum sequence identifier is equal to the current sequence identifier from the first initiator; and
if the initiator allowed queue depth is not equal to the first queue depth then the controller places the new I/O request on a queue, increments the first queue depth, and adjusts the maximum sequence identifier;
wherein adjusting the maximum sequence identifier comprises the processor adds the current sequence identifier to the initiator allowed queue depth and subtracts the first queue depth from the sum of the current sequence identifier and the initiator allowed queue depth.

11. The controller of claim 10, wherein the processor generates the initiator allowed queue depth in response to an initiator logs into or logs out of the target port.

12. The controller of claim 11, wherein the controller completes the new I/O request, wherein in response to the controller completes the new I/O request, the processor modifies the first queue depth, reduces the maximum sequence identifier, and sends the maximum sequence identifier to the first initiator, wherein the processor reduces the first queue depth comprises the processor subtracts the new I/O request from the first queue depth.

13. The controller of claim 11, wherein the new I/O request is a plurality of new I/O requests, wherein determining comprises:
if the initiator allowed queue depth is equal to the first queue depth then the controller returns the queue full indication and the maximum sequence identifier to the initiator; and
if the initiator allowed queue depth is not equal to the first queue depth then the processor places the plurality of new I/O requests on the queue, increments the first queue depth by the number of I/O requests in the plurality of new I/O requests, and adjusts the maximum sequence identifier,
wherein adjusts the maximum sequence identifier comprises the processor adds the current sequence identifier to the initiator allowed queue depth and subtracts the sum of the first queue depth and the number of I/O requests in the plurality of new I/O requests.

14. The controller of claim 11, wherein a plurality of initiators comprising the first initiator are logged into the target port, wherein if the initiator allowed queue depth is equal to the first queue depth:

if the sum of the queue depths of each of the plurality of initiators is equal to the maximum queue depth for the target port, the controller returns the queue full indication and the maximum sequence identifier to the first initiator; and if the sum of the queue depths of each of the plurality of initiators is less than the maximum queue depth for the target port, the controller foregoes returning the queue full indication to the first initiator and the processor places the new I/O request on the queue, increments the first queue depth, and modifies the maximum sequence identifier, wherein the processor modifies the maximum sequence identifier comprises the processor adds the current sequence identifier to the maximum queue depth for the target port and subtracts the sum of the queue depths of each of the plurality of initiators.

15. The controller of claim 11, wherein the controller comprises a plurality of target ports comprising the target port;

if no initiators are logged into the target port, the processor sets the maximum queue depth for the target port to zero; and if at least one initiator is logged into the target port, the processor sets the maximum queue depth for the target port to a maximum queue depth for the controller divided by the number of target ports in the plurality of target ports having at least one initiator logged in.

16. The controller of claim 14, wherein if at least one initiator is logged into the target port, the processor reduces the maximum queue depth for the target port to a predetermined queue depth if the maximum queue depth exceeds the predetermined queue depth.

17. The controller of claim 14, wherein if at least a first initiator is logged into a first target port comprising a first predetermined queue depth and a second initiator is logged into a second target port comprising a second predetermined queue depth, the processor increases the maximum queue depth for the second target port by the difference between the maximum queue depth for the first target port and the first predetermined queue depth, wherein the maximum queue depth for the first target port is greater than the first predetermined queue depth, wherein the difference between the maximum queue depth for the first target port and the first predetermined queue depth is not greater than the second predetermined queue depth; and after the processor increases the maximum queue depth for the second target port, the processor reduces the maximum queue depth for the first target port to the first predetermined queue depth.

18. The controller of claim 14, wherein the processor determines the maximum queue depth for the target port whenever an initiator logs in or logs out of any target port in the plurality of target ports.

19. The controller of claim 14, wherein the processor recalculates the maximum queue depth for all target ports of the controller whenever an only initiator logged into a target port of the plurality of target ports logs out of the target port, wherein the processor recalculates the maximum queue depth for all target ports of the controller whenever one or more initiators log into a target port of the plurality of target ports after no initiators were logged into the target port, wherein recalculating the maximum queue depth for all target ports of the controller comprises the processor sets the maximum queue depth for each target port to the maximum controller queue depth divided by the number of target ports with at least one initiator logged into the target port.

20. A method for maximizing I/O requests to a controller from a plurality of initiators logged into a plurality of target ports of the controller, comprising:

obtaining, by the controller, a total initiator queue depth, wherein the total initiator queue depth is a sum of the current queue depths for all initiators logged into the plurality of target ports;

receiving, by a target port of the plurality of target ports, a new I/O request and a current sequence identifier from a first initiator of the plurality of initiators; and determining, by the controller, if the total initiator queue depth is equal to a maximum controller queue depth;

if the total initiator queue depth is equal to the maximum controller queue depth then returning, by the controller, a queue full indication and a maximum sequence identifier to the first initiator, wherein the maximum sequence identifier is equal to the current sequence identifier from the first initiator; and if the total initiator queue depth is not equal to the maximum controller queue depth then:

placing, by the controller, the new I/O request on a queue;

incrementing, by the controller, a first queue depth, wherein the first queue depth corresponds to the first initiator;

adjusting, by the controller, a maximum sequence identifier, wherein adjusting the maximum sequence identifier comprises adding the current sequence identifier to the maximum controller queue depth and subtracting the total initiator queue depth from the sum of the current sequence identifier and the maximum controller queue depth; and completing, by the controller, the new I/O request;

in response to completing the new I/O request:

modifying, by the controller, the first queue depth, wherein modifying the first queue depth comprises subtracting the new I/O request from the first queue depth;

adjusting, by the controller, the maximum sequence identifier; and sending the maximum sequence identifier, by the controller, to the initiator.

21. A method for maximizing I/O requests to a target port of a controller from a plurality of initiators logged into the target port, comprising:

assigning, by the controller, a guaranteed first initiator queue depth to a first initiator of the plurality of initiators;

receiving, by the target port, a first I/O request and a first sequence identifier from the first initiator; and determining, by the controller, if a first queue depth corresponding to the first initiator is equal to the guaranteed first initiator queue depth;

if the first queue depth is equal to the guaranteed first initiator queue depth then returning, by the controller, a queue full indication and a first maximum sequence identifier to the first initiator, wherein the first maximum sequence identifier is equal to the first sequence identifier;

if the first queue depth is not equal to the guaranteed first initiator queue depth then:

placing, by the controller, the first I/O request on a queue;

incrementing, by the controller, the first queue depth; and adjusting, by the controller, the first maximum sequence identifier, wherein adjusting the first maximum sequence identifier comprises adding the first sequence identifier to the guaranteed first initiator queue depth and subtracting the first queue depth from the sum of the first sequence identifier and the guaranteed first initiator queue depth;

receiving, by the target port, a second I/O request and a second sequence identifier from a second initiator of the plurality of initiators;

determining, by the controller, if a remaining controller queue depth is equal to zero, wherein the remaining controller queue depth is the difference between a maximum controller queue depth and the sum of current queue depths for all logged-in initiators and a first initiator reserved queue depth;

if the remaining controller queue depth is equal to zero then returning, by the controller, a queue full indication and a second maximum sequence identifier to the second initiator, wherein the second maximum sequence identifier is equal to the second sequence identifier;

if the remaining controller queue depth is not equal to zero then:

placing, by the controller, the second I/O request on a queue;

incrementing, by the controller, the second queue depth; and adjusting, by the controller, the second maximum sequence identifier, wherein adjusting the second maximum sequence identifier comprises adding the second sequence identifier to the remaining controller queue depth and subtracting the sum of the current queue depths for all logged-in initiators and the first initiator reserved queue depth from the sum of the second maximum sequence identifier and the remaining controller queue depth.

22. A method for maximizing I/O requests to a controller from a plurality of initiators logged into a number of target ports of the controller, comprising:

assigning, by the controller, a guaranteed first initiator queue depth to a first initiator of the plurality of initiators;

receiving, by a target port of the number of target ports, a first I/O request and a first sequence identifier from the first initiator; and determining, by the controller, if a first queue depth corresponding to the first initiator is equal to the guaranteed first initiator queue depth;

if the first queue depth is equal to the guaranteed first initiator queue depth then:

returning, by the controller, a queue full indication and a first maximum sequence identifier to the first initiator, wherein the first maximum sequence identifier is equal to the first sequence identifier; and if the first queue depth is not equal to the guaranteed first initiator queue depth then:

placing, by the controller, the first I/O request on a queue;

incrementing, by the controller, the first queue depth; and adjusting, by the controller, the first maximum sequence identifier, wherein adjusting the first maximum sequence identifier comprises adding the first sequence identifier to the guaranteed first initiator queue depth and subtracting the first queue depth from the sum of the first sequence identifier and the guaranteed first initiator queue depth;

receiving, by a target port of the number of target ports, a second I/O request and a second sequence identifier from a second initiator; and determining, by the controller, if a remaining other initiator queue depth is equal to zero, wherein the remaining other initiator queue depth is the difference between a remaining total initiator queue depth and the sum of current queue depths for all logged-in initiators other than the first initiator, wherein the remaining total initiator queue depth is the difference between a maximum controller queue depth and the guaranteed first initiator queue depth;

if the remaining other initiator queue depth is equal to zero then:

returning, by the controller, a queue full indication and a second maximum sequence identifier to the second initiator, wherein the second maximum sequence identifier is equal to the second sequence identifier; and if the remaining other initiator queue depth is not equal to zero then:

placing, by the controller, the second I/O request on a queue;

incrementing, by the controller, the second queue depth; and adjusting, by the controller, the second maximum sequence identifier, wherein adjusting the second maximum sequence identifier comprises adding the second sequence identifier to the remaining total initiator queue depth and subtracting the sum of the current queue depths for all logged-in initiators other than the first initiator from the sum of the second sequence identifier and the remaining total initiator queue depth.

23. A method for maximizing I/O requests from an initiator logged into a target port of a controller, comprising:

assigning, by the controller, a guaranteed initiator queue depth to the initiator;

maintaining, by the controller, a demand rate for the initiator, wherein the demand rate is the number of I/O requests received from the initiator in a predetermined immediately previous time period;

receiving, by the target port, a new I/O request and a current sequence identifier from the initiator; and determining, by the controller, if an initiator current queue depth corresponding to the initiator is equal to the guaranteed initiator queue depth;

if the initiator current queue depth is equal to the guaranteed initiator queue depth then:

returning, by the controller, a queue full indication and a maximum sequence identifier to the initiator, wherein the maximum sequence identifier is equal to the sequence identifier; and if the initiator current queue depth is not equal to the guaranteed initiator queue depth then:

placing, by the controller, the new I/O request on a queue;

incrementing, by the controller, the initiator current queue depth; and adjusting, by the controller, the maximum sequence identifier, wherein adjusting the maximum sequence identifier comprises adding the sequence identifier to the guaranteed initiator queue depth and subtracting the initiator current queue depth from the sum of the sequence identifier and the guaranteed initiator queue depth;

determining, by the controller, if the demand rate is less than a predetermined demand rate;

if the demand rate is less than the predetermined demand rate then:

maintaining the guaranteed initiator queue depth; and if the demand rate is not less than the predetermined demand rate then:

increasing the guaranteed initiator queue depth to be less than or equal to a maximum port queue depth.

* * * * *